US012806907B2

(12) United States Patent
Saka et al.

(10) Patent No.: US 12,806,907 B2
(45) Date of Patent: Nov. 24, 2026

(54) RECORDING DEVICE

(71) Applicant: SEIKO EPSON CORPORATION, Tokyo (JP)

(72) Inventors: Yoshihisa Saka, Shiojiri (JP); Akihiro Toya, Shiojiri (JP); Yoshikane Tsuchihashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 156 days.

(21) Appl. No.: 18/779,168

(22) Filed: Jul. 22, 2024

(65) Prior Publication Data

US 2025/0033362 A1 Jan. 30, 2025

(30) Foreign Application Priority Data

Jul. 25, 2023 (JP) ................................ 2023-120838

(51) Int. Cl.

*B41J 2/175* (2006.01)
*B41J 13/10* (2006.01)
*B41J 29/02* (2006.01)
*B41J 29/13* (2006.01)
*B41J 29/377* (2006.01)

(52) U.S. Cl.

CPC ............ *B41J 2/175* (2013.01); *B41J 13/106* (2013.01); *B41J 29/02* (2013.01); *B41J 29/13* (2013.01); *B41J 29/377* (2013.01)

(58) Field of Classification Search

CPC . B41J 2/175; B41J 13/106; B41J 29/02; B41J 29/13; B41J 29/377; B41J 2/17509; B41J 2/1752; B41J 2/01; B41J 29/00

See application file for complete search history.

(56) References Cited

U.S. PATENT DOCUMENTS

| | | | | |
|---|---|---|---|---|
| 2020/0047512 | A1 | 2/2020 | Kida et al. | |
| 2021/0237481 | A1 | 8/2021 | Misawa et al. | |
| 2022/0258470 | A1 * | 8/2022 | Toya | B41J 2/19 |

FOREIGN PATENT DOCUMENTS

| | | | |
|---|---|---|---|
| JP | 2020-026073 | A | 2/2020 |
| JP | 2021-121556 | A | 8/2021 |

* cited by examiner

*Primary Examiner* — Lisa Solomon
(74) *Attorney, Agent, or Firm* — WORKMAN NYDEGGER

(57) ABSTRACT

It includes a recording section extending in one direction, the recording section configured to eject liquid simultaneously across an entire width of a medium M1, a mounting section on which a container containing a liquid is mounted, a flow path coupled to the recording section and the mounting section, and a housing 15 that houses the recording section, the mounting section, and the flow path, wherein the housing defines a discharge space S1 to which the medium recorded by the recording section is discharged, the discharge space is a space outside the housing, and the flow path overlaps with the discharge space when viewed from the one direction.

16 Claims, 14 Drawing Sheets

RECORDING DEVICE

The present application is based on, and claims priority from JP Application Serial Number 2023-120838, filed Jul. 25, 2023, the disclosure of which is hereby incorporated by reference herein in its entirety.

BACKGROUND

1. Technical Field

The present disclosure relates to a recording device.

2. Related Art

JP-A-2021-121556 discloses a recording device including a recording section that records an image on a medium, and a housing that defines a discharge space to which the recorded medium is discharged. The recording section records an image on a medium with a liquid supplied from a container containing the liquid. The recording section and the container are housed in the housing. The discharge space is located in an upper portion of the housing.

In such the recording device, the recording section and the container are coupled to each other by the flow path. The flow path is pulled around in the housing. At this time, it is conceivable that the flow path is housed below the discharge space in the housing. In order to secure a space for hosing the flow path in the housing, the housing may be increased in size in the vertical direction.

SUMMARY

A recording device according to solve the above-described problem includes a recording section extending in one direction, the recording section configured to eject liquid simultaneously across an entire width of a medium, a mounting section on which a container containing a liquid is mounted, a flow path coupled to the recording section and the mounting section, and a housing that houses the recording section, the mounting section, and the flow path, wherein the housing defines a discharge space to which the medium recorded by the recording section is discharged, the discharge space is a space outside the housing, and the flow path overlaps with the discharge space when viewed from the one direction.

DESCRIPTION OF EMBODIMENTS

Hereinafter, an embodiment of a recording device will be described with reference to the drawings. The recording device is, for example, an inkjet type printer which records an image such as a character or a photograph by ejecting ink which is an example of a liquid onto a medium such as a sheet or a fabric.

Recording Device

Figure 1:
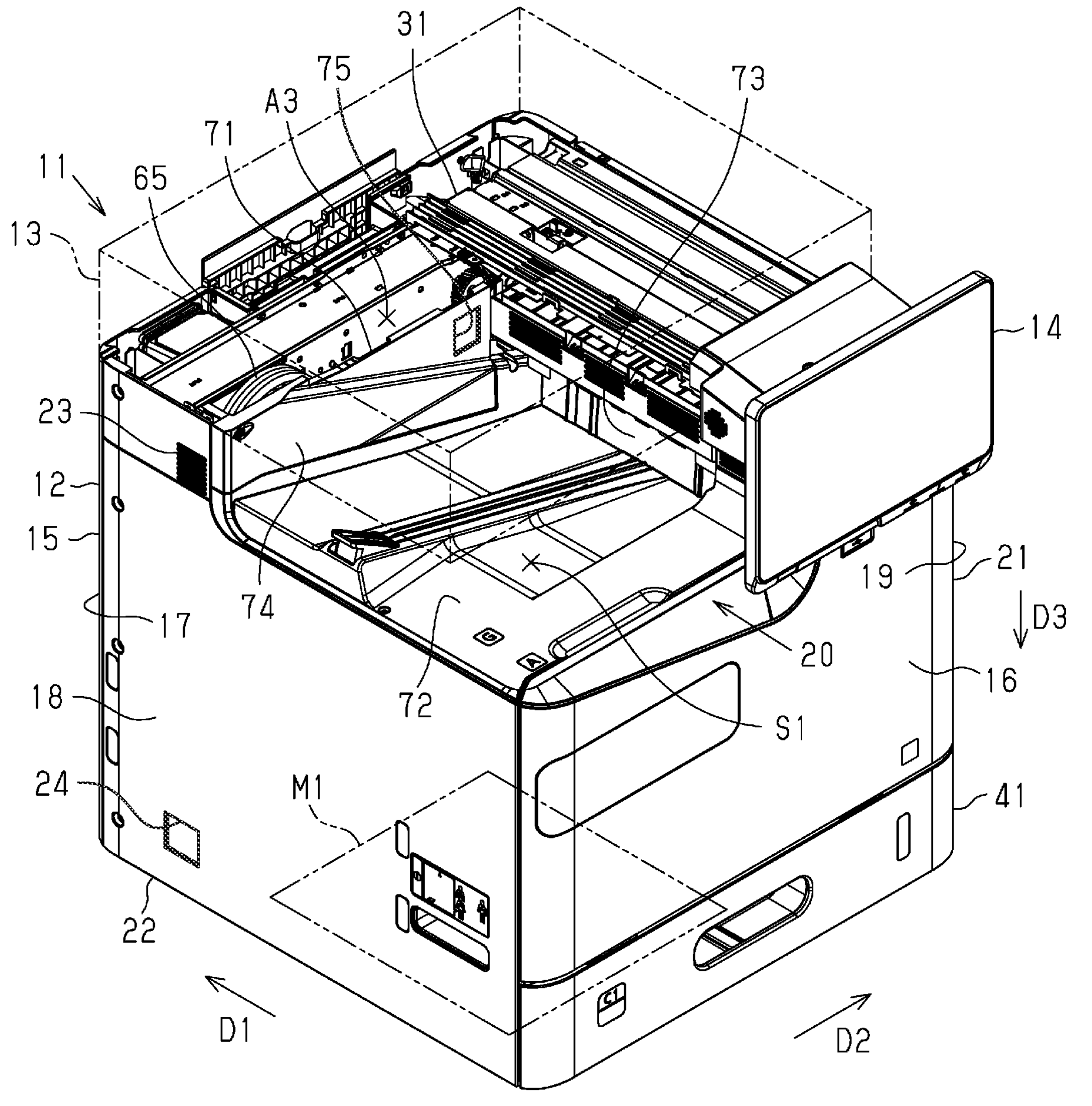
FIG. 1 is a perspective view showing an embodiment of a recording device.

As shown in FIG. 1, a recording device 11 includes a device main body 12. The device main body 12 is configured to record an image on a medium M1. The device main body 12 will be described in detail later. The recording device 11 may be a multifunction device having not only a function of recording an image on the medium M1 but also other functions.

The recording device 11 may include a reading section 13. The reading section 13 is configured to read an image recorded on a document. The reading section 13 is a scanner. The reading section 13 sequentially reads an image by automatically feeding a set document. The reading section 13 is mounted on the device main body 12. The reading section 13 is mounted on an upper portion of the device main body 12. The reading section 13 overlaps the device main body 12 when viewed from the vertical direction D3.

The recording device 11 includes an operation section 14. The operation section 14 is an interface for a user to operate the recording device 11. The operation section 14 is, for example, a touch panel. The operation section 14 may include a button, a lever, a switch, and the like. The operation section 14 is positioned in front of the device main body 12 and the reading section 13.

Device Main Body

The device main body 12 includes a housing 15. The housing 15 houses various components of the device main body 12. The housing 15 has a rectangular parallelepiped shape. The housing 15 has a depth, a width, and a height. The depth of the housing 15 is a length in the first direction D1 of the housing 15. The width of the housing 15 is the length in the second direction D2 of the housing 15. The height of the housing 15 is the length in the vertical direction D3 of the housing 15. The first direction D1 is a direction different from the second direction D2 and the vertical direction D3. The first direction D1 is a direction from the front toward the back of the housing 15. The second direction D2 is a direction different from the vertical direction D3. The second direction D2 is a direction from left to right when the housing 15 is viewed from the first direction D1. The first direction D1 and the second direction D2 indicate directions in which an installation surface on which the device main body 12 is installed spreads.

The housing 15 has a plurality of surfaces. The housing 15 has a front surface 16, a rear surface 17, and two side surfaces. More specifically, the housing 15 has the front surface 16, the rear surface 17, a first side surface 18, and a second side surface 19. The front surface 16 faces a direction opposite to the first direction D1. For example, the front surface 16 faces the same direction as the operation section 14. The front surface 16 is a surface facing a user who operates the recording device 11. The rear surface 17 is a surface opposite to the front surface 16. The rear surface 17 faces the first direction D1. The front surface 16 and the rear surface 17 extend in the second direction D2 and the vertical direction D3. The first side surface 18 faces a direction opposite to the second direction D2. The first side surface 18 faces a direction different from the front surface 16, the rear surface 17, and the second side surface 19. The second side surface 19 faces opposite to the first side surface 18. The second side surface 19 faces the second direction D2. The first side surface 18 and the second side surface 19 extend in the first direction D1 and the vertical direction D3.

The housing 15 has a shape obtained by hollowing out a part of a rectangular parallelepiped. A recess section 20 is formed in the housing 15. For example, the recess section 20 is provided so as to hollow out a corner of the housing 15. For example, the recess section 20 is provided such that the front surface 16 and the first side surface 18 are recessed. The recess section 20 is positioned below the reading section 13.

The housing 15 defines a discharge space S1. The discharge space S1 is a space to which the recorded medium M1 is discharged. The discharge space S1 is formed by the recess section 20. The discharge space S1 is a space outside the housing 15. In the discharge space S1, the medium M1 discharged from the housing 15 is stored. For example, the discharge space S1 is a space surrounded by the reading section 13 and the housing 15. The discharge space S1 is exposed through the front surface 16 and the first side surface 18. Therefore, the user can access the discharge space S1 from a position facing the front surface 16. The user can access the discharge space S1 from a position facing the first side surface 18.

The housing 15 may have one or more covers. For example, the housing 15 has a front cover 21. The front cover 21 constitutes the front surface 16. The front cover 21 is configured to be open and closed. When the front cover 21 is opened, the inside of the housing 15 is exposed.

The housing 15 may include a side cover 22. The side cover 22 is a cover constituting the first side surface 18. The side cover 22 is configured to be open and closed. When the side cover 22 is open, the inside of the housing 15 is exposed.

One or more through holes 23 may be formed on the housing 15. The through hole 23 is opened in a surface of the housing 15. For example, the through hole 23 is open on the first side surface 18. For example, the through hole 23 is open on the side cover 22. The through hole 23 is not limited to be open on the first side surface 18, and may be open, for example, on the rear surface 17. The inside and the outside of the housing 15 communicate with each other through the through hole 23. Through the through hole 23, air flows into the housing 15 from the outside of the housing 15, and air flows out of the housing 15 from the inside of the housing 15.

One or more air vent ports 24 may be formed in the housing 15. The air vent port 24 is opened in a surface of the housing 15. That is, the air vent port 24 opens on the first side surface 18. The air vent port 24 is opened on the same surface as the through hole 23. For example, the air vent port 24 is opened on the side cover 22. The air vent port 24 is located below the through hole 23. The inside and outside of the housing 15 communicate with each other through the air vent port 24. Through the air vent port 24, air flows into the housing 15 from the outside of the housing 15, and air flows out of the housing 15 from the inside of the housing 15. Air flows into and out of the housing 15 through the through hole 23 and the air vent port 24. The air vent port 24 is not shown in FIG. 3.

Figure 2:
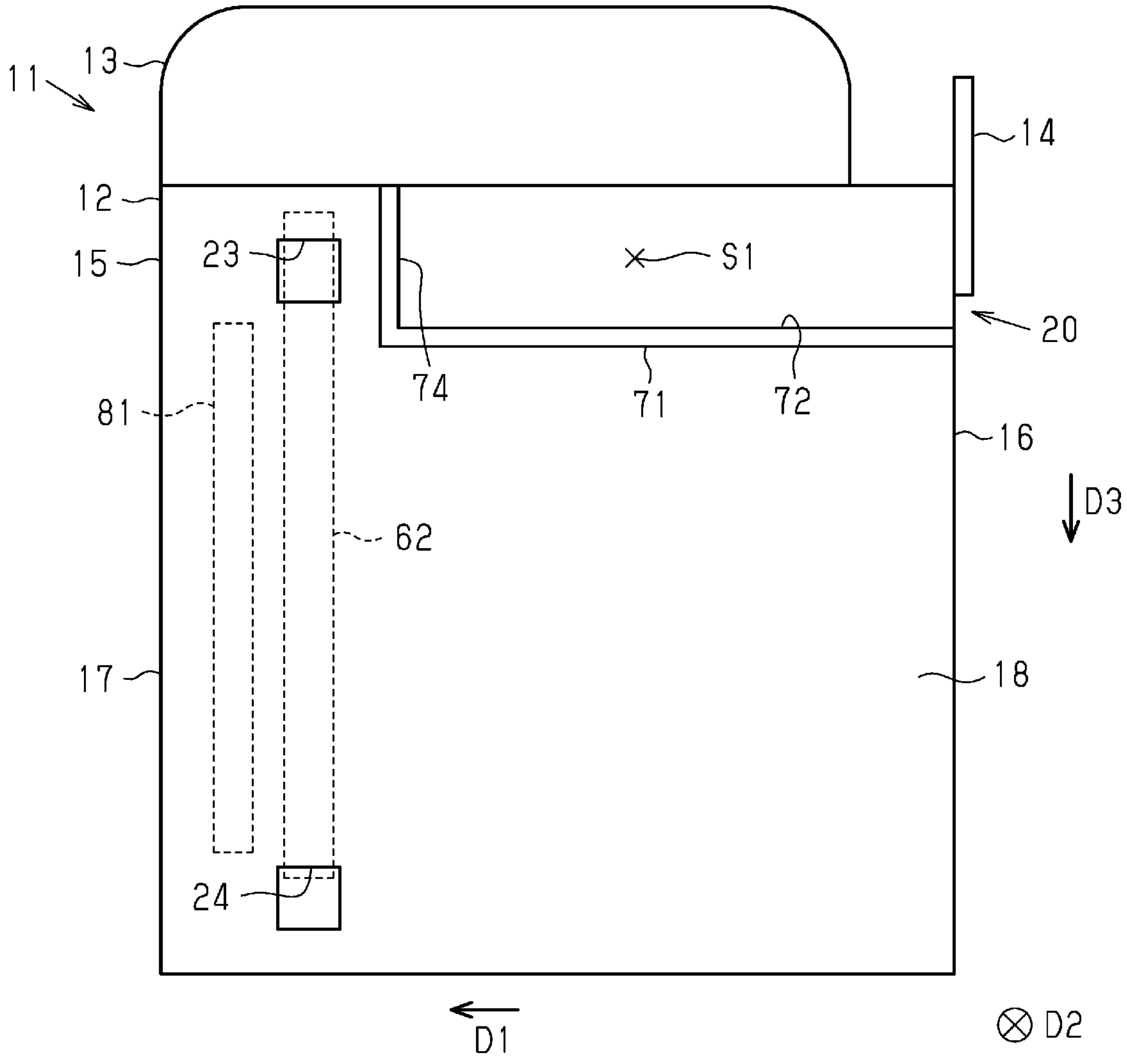
FIG. 2 is a side view of the recording device.

As shown in FIG. 2, the through hole 23 and the air vent port 24 allow the inside and the outside of the housing 15 to communicate with each other, thereby cooling a circuit board 81 described later. The uppermost end of the through hole 23 is located above the uppermost end of the circuit board 81. The lowermost end of the air vent port 24 is located below the lowermost end of the circuit board 81. When the air flows from the through hole 23 toward the air vent port 24 or from the air vent port 24 toward the through hole 23, the air flows over the entire length of the circuit board 81 in the vertical direction D3. Thus, the circuit board 81 is effectively cooled.

When viewed from the first direction D1, the through hole 23 overlaps with a flow path 62 described later. Thus, the flow path 62 is effectively cooled. The air vent port 24 may overlap the flow path 62 when viewed from the first direction D1. In this case, the flow path 62 is further cooled.

Figure 3:
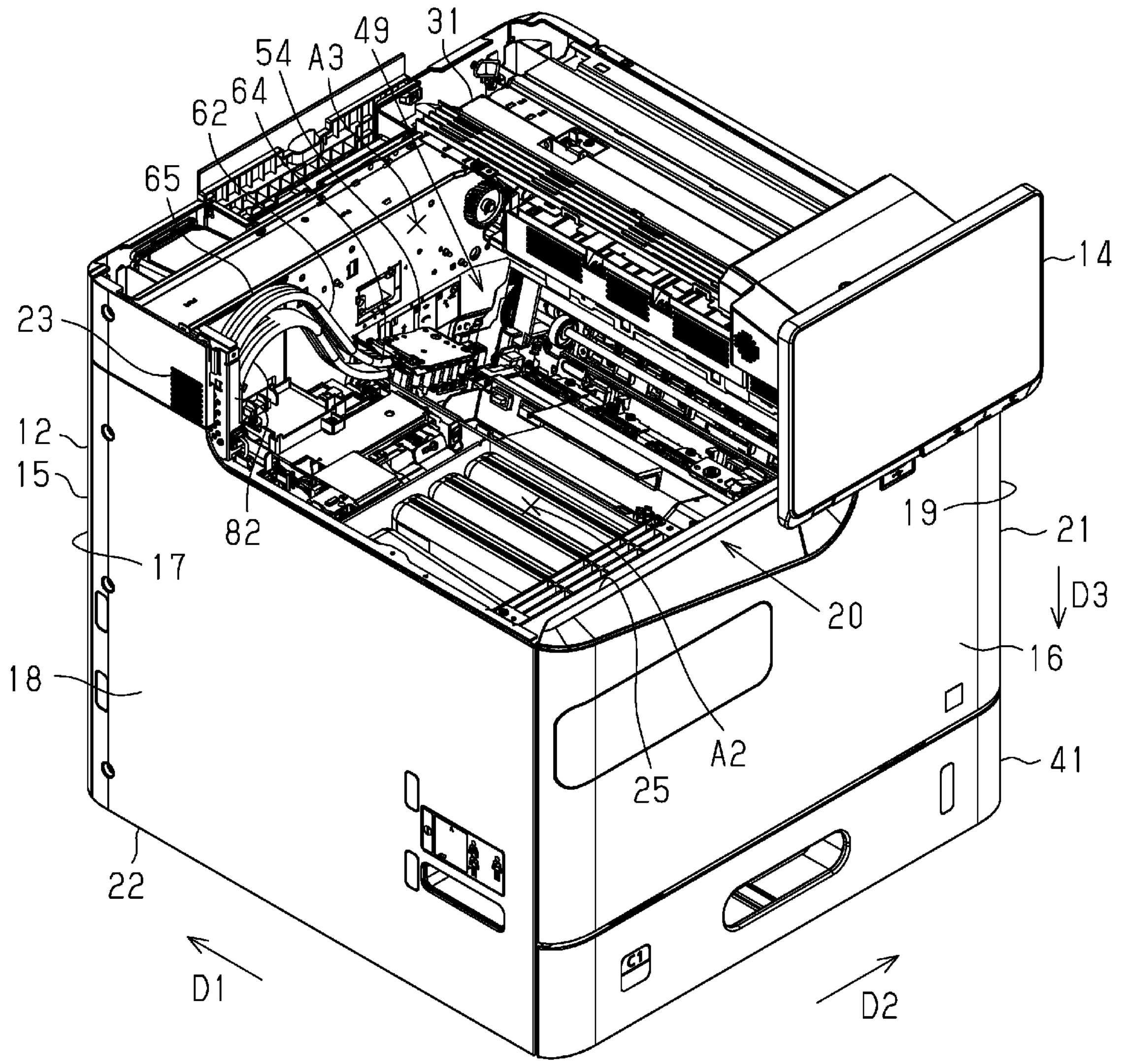
FIG. 3 is a perspective view of the recording device shown in FIG. 1 from which a stacking section is removed.

As shown in FIG. 3, an exposure port 25 may be opened in the housing 15. The exposure port 25 is opened in an upper portion of the housing 15. The exposure port 25 is opened to the recess section 20. The exposure port 25 is defined by, for example, the front cover 21 and the side cover 22. The exposure port 25 exposes the inside of the housing 15. The user can perform maintenance of the device main body 12 through the exposure port 25.

Figure 4:
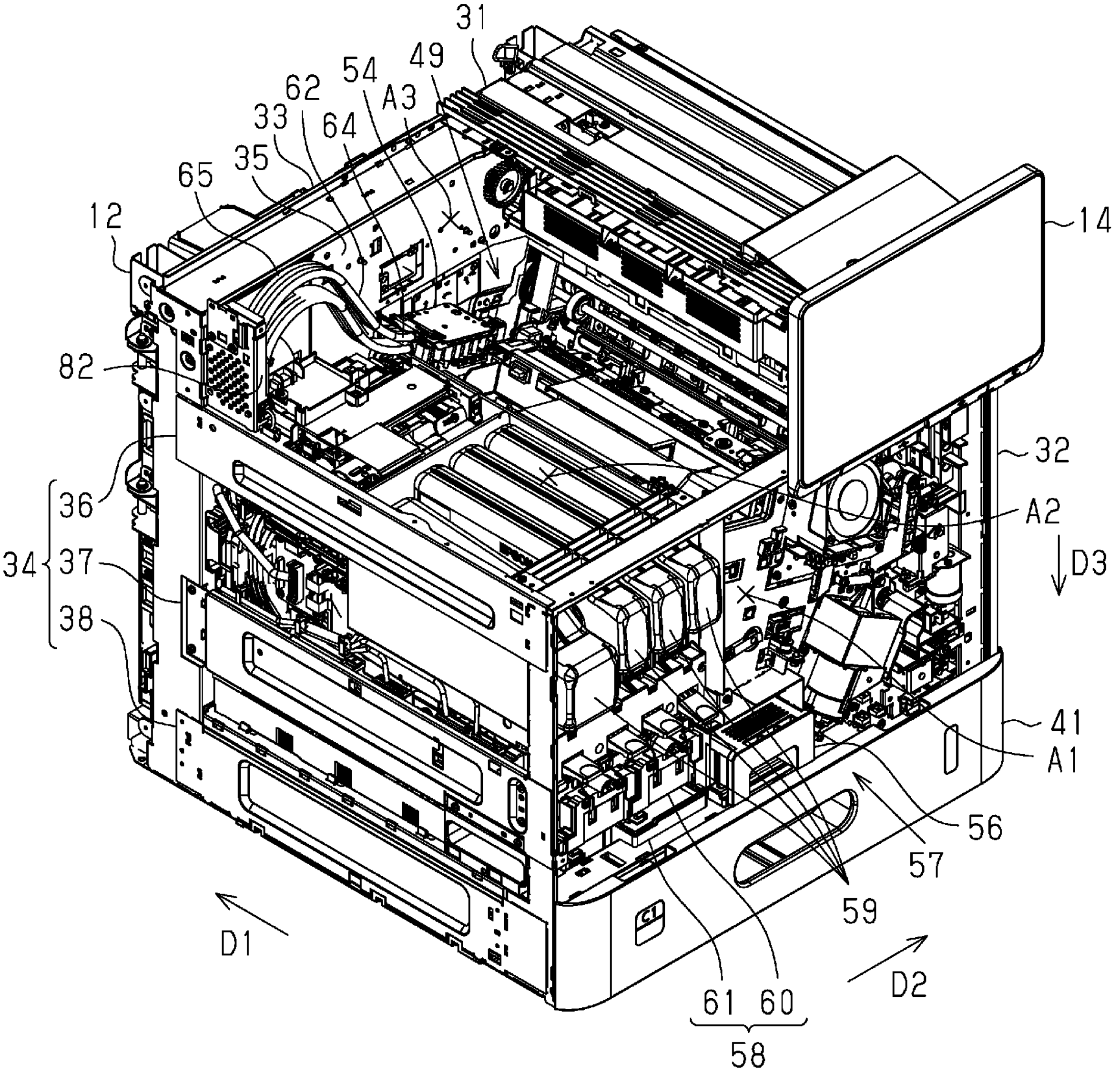
FIG. 4 is a perspective view of the recording device shown in FIG. 3 from which a housing is removed.

As shown in FIG. 4, the device main body 12 includes a frame section 31. The frame section 31 is housed in the housing 15. The discharge space S1 is defined by the frame section 31 being covered by the housing 15. Therefore, it can be said that the frame section 31 defines the discharge space S1.

The frame section 31 supports the reading section 13. The frame section 31 supports the operation section 14. The frame section 31 supports the housing 15. The frame section 31 defines a frame space A1. The frame space A1 is a space surrounded by the frame section 31. That is, the frame space A1 is a space inside the frame section 31. The frame space A1 is a space in the housing 15. Various components of the device main body 12 are located in the frame space A1. The frame section 31 supports various components housed in the housing 15.

The frame section 31 includes one or more frames. For example, the frame section 31 includes a first frame 32, a second frame 33, and a third frame 34. The first frame 32, the second frame 33, and the third frame 34 defines a frame space A1. The frame is made of, for example, metal. Accordingly, the rigidity of the device main body 12 is secured.

The first frame 32 and the second frame 33 are arranged in one direction. For example, the first frame 32 and the second frame 33 are arranged in the first direction D1. The first frame 32 is positioned in front of the device main body 12. The first frame 32 is, for example, a front frame. The second frame 33 is positioned closer to the first direction D1 than the first frame 32. The second frame 33 is positioned at the rear of the device main body 12. The second frame 33 is, for example, a rear frame. The third frame 34 couples the first frame 32 and the second frame 33. The third frame 34 is positioned on a lateral side of the device main body 12.

The third frame 34 is, for example, a side frame. The third frame 34 is attached to the first frame 32 and the second frame 33.

The second frame 33 has a frame wall 35. The frame wall 35 spreads in the second direction D2 and the vertical direction D3.

The frame wall 35 is a wall that partitions the inside and the outside of the frame section 31. The frame wall 35 partitions the inside and the outside of the frame section 31 in the housing 15. In the housing 15, a space in the first direction D1 side with respect to the frame wall 35 is a space outside the frame section 31. In the housing 15, a space in a direction opposite to the first direction D1 with respect to the frame wall 35 is a space inside of the frame section 31.

The third frame 34 includes one or more frame members. For example, the third frame 34 includes a first frame member 36, a second frame member 37, and a third frame member 38. The frame member couples the first frame 32 and the second frame 33. The frame member extends in the first direction D1. The frame member is a plate extending in the first direction D1 and the vertical direction D3.

The plurality of frame members may be positioned so as to be separated from each other in the vertical direction D3. For example, the first frame member 36, the second frame member 37, and the third frame member 38 are located apart from each other in the vertical direction D3. For example, the first frame member 36, the second frame member 37, and the third frame member 38 are arranged in this order in the vertical direction D3.

The frame member is attached to the first frame 32 and the second frame 33. The first frame member 36 may be welded to the first frame 32 and the second frame 33. In this case, the rigidity of the frame section 31 is improved. The frame member may be screwed to the first frame 32 and the second frame 33. In this case, the frame member is detachably attached to the first frame 32 and the second frame 33. By removing the frame member, the user can access the inside of the frame section 31 from the side of the device main body 12. Therefore, the maintainability of the device main body 12 is improved.

Figure 5:
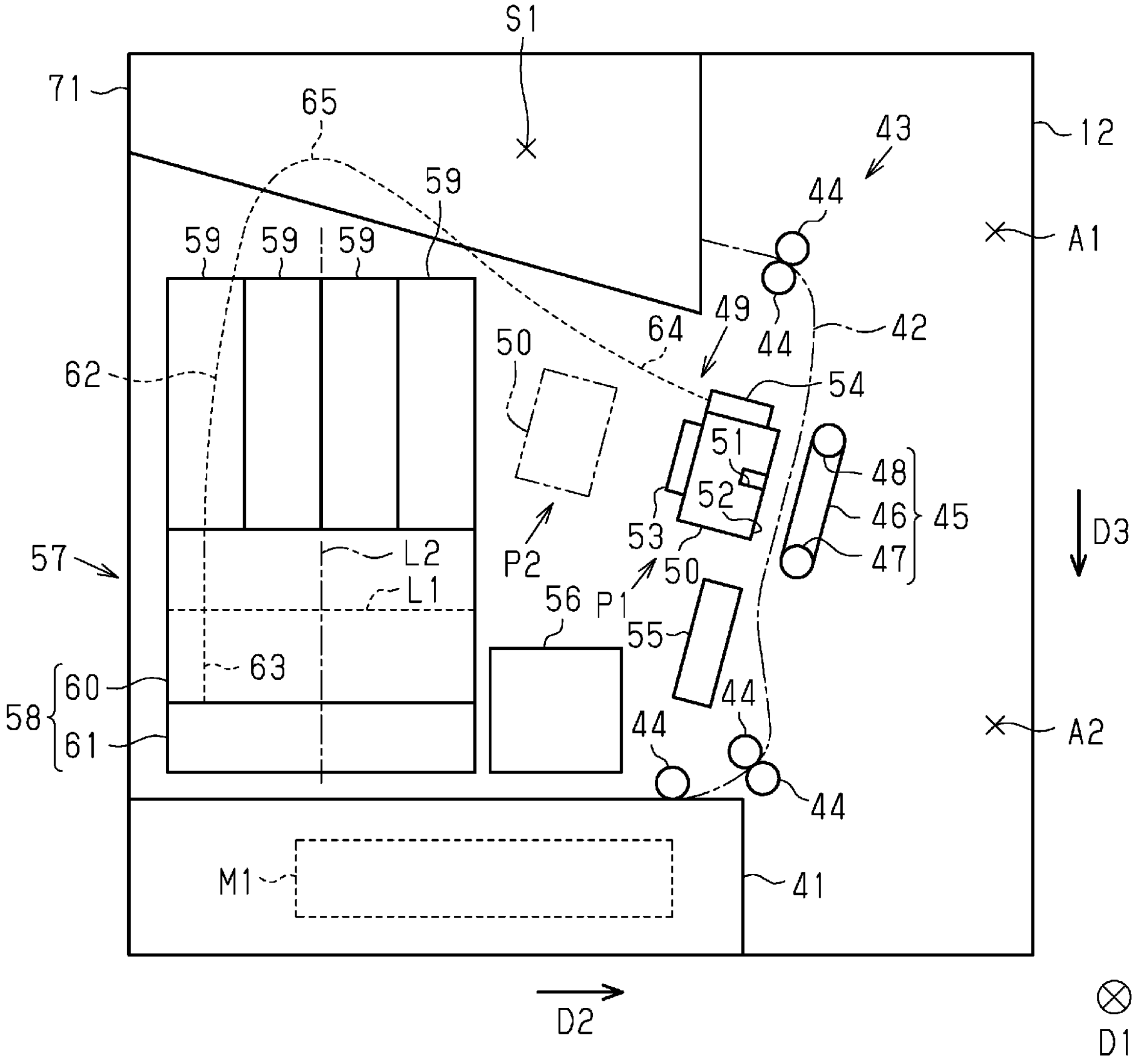
FIG. 5 is a front view schematically illustrating an internal configuration of the recording device.

As shown in FIG. 5, the device main body 12 has a accommodation section 41. The accommodation section 41 is configured to accommodate the medium M1. For example, plural sheets of medium M1 are accommodated in the accommodation section 41 in a stacked state. The accommodation section 41 is attached to the housing 15. The accommodation section 41 is located in a lower portion of the housing 15. For example, the accommodation section 41 is configured to be insertable into and removable from the housing 15. The accommodation section 41 is, for example, a cassette. For example, the accommodation section 41 is insertable into and removable from the front surface 16. The user can replenish the accommodation section 41 with the medium M1 by pulling out the accommodation section 41 from the housing 15. The accommodation section 41 is not limited to a cassette and may be a tray.

The device main body 12 includes a transport path 42. The transport path 42 is a path along which medium M1 is transported. The transport path 42 is pulled around in the housing 15. The transport path 42 extends from the inside of the housing 15 toward the outside of the housing 15. Specifically, the transport path 42 extends from the accommodation section 41 toward the discharge space S1. An image is recorded on the medium M1 in the process of being transported along the transport path 42.

The device main body 12 includes a transport section 43. The transport section 43 is configured to transport medium M1. The transport section 43 transports the medium M1 stored in the accommodation section 41. The transport section 43 transports medium M1 along the transport path 42. The transport section 43 includes one or more rollers 44. For example, the transport section 43 includes a plurality of rollers 44. The plurality of rollers 44 are arranged along the transport path 42. The plurality of rollers 44 rotate to transport the medium M1, respectively.

The device main body 12 includes a support section 45. The support section 45 is configured to support the medium M1. The support section 45 supports the medium M1 transported from the accommodation section 41. The support section 45 supports the medium M1 transported through the transport path 42. For example, the support section 45 supports the medium M1 in a posture inclined with respect to the horizontal direction. The support section 45 supports the medium M1 by attracting it. Thus, the posture of the medium M1 is stabilized. The support section 45 may support the medium M1 in a horizontal posture.

The support section 45 may be configured to transport the medium M1. For example, the support section 45 includes a transport belt 46, a first pulley 47, and a second pulley 48. The transport belt 46 is wound around the first pulley 47 and the second pulley 48. The transport belt 46 attracts the medium M1 by, for example, electrostatic force. Accordingly, the transport belt 46 supports the medium M1. For example, the transport belt 46 may be configured to attract the medium M1 by negative pressure due to suction. When the first pulley 47 and the second pulley 48 rotate, the transport belt 46 rotates. As a result, the medium M1 supported by the transport belt 46 are transported. For example, the transport belt 46 transports the medium M1 obliquely upward. The support section 45 may be a simple support base.

The device main body 12 includes a recording section 49. The recording section 49 is configured to record an image on the medium M1. The recording section 49 records an image on the medium M1 by ejecting liquid onto the medium M1. The recording section 49 faces the support section 45. The recording section 49 records an image on the medium M1 supported by the support section 45.

The recording section 49 extends in one direction. Specifically, the recording section 49 extends in the first direction D1. The recording section 49 includes a line head configured to eject the liquid simultaneously over the entire width of the medium M1. The recording section 49 includes a head 50. The head 50 includes an ejection surface 52 in which one or more nozzles 51 are opened. The head 50 ejects the liquid from the nozzles 51. The ejection surface 52 faces the medium M1. The ejection surface 52 faces the support section 45.

The recording section 49 includes a head control section 53. The head control section 53 is configured to control the head 50. The head control section 53 controls ejection of the liquid by controlling the head 50. The head control section 53 is located above the head 50. For example, the head control section 53 is located on the upper surface of the head 50. The upper surface of the head 50 is a surface opposite to the ejection surface 52 in the head 50. The head control section 53 is coupled to the circuit board 81 which will be described later. The head control section 53 is coupled to the circuit board 81 by, for example, an electric wire, a signal line, or the like.

The head control section 53 may be configured by one or more processors that execute various processes according to a computer program. The head control section 53 may be configured by one or more dedicated hardware circuits such as an ASIC that executes at least a part of various processes. The head control section 53 may be configured by a circuit including a combination of a processor and a hardware circuit. The processor includes a CPU and memories such as a RAM and a ROM. The memory stores program code or instructions configured to cause the CPU to perform processes. The memory, that is, computer-readable medium, includes any readable medium that can be accessed by a general purpose or special purpose computer.

The recording section 49 includes a joint 54. The joint 54 is coupled to a liquid supply section 57. A liquid is supplied to the head 50 through the joint 54. The joint 54 is located above the head 50. For example, the joint 54 is located on a side of the head 50. Specifically, the joint 54 is located on a side surface facing upward among a plurality of side surfaces of the head 50.

The recording section 49 is housed in the housing 15. The recording section 49 is supported by the frame section 31. Specifically, the recording section 49 is supported by the first frame 32 and the second frame 33. The recording section 49 is provided, for example, across the first frame 32 and the second frame 33.

The recording section 49 is located below the discharge space S1 in the housing 15. In the housing 15, a space located at the same height as the discharge space S1 becomes small due to the presence of the recess section 20. On the other hand, in the housing 15, a space below the discharge space S1 is large. Since the recording section 49 is located in a large volume space, it is easy to record an image on the medium M1.

The recording section 49 is configured to be displaced between a recording position P1 and a retreat position P2. The recording section 49 is displaced between a recording position P1 and a retreat position P2 by moving in a direction perpendicular to the ejection surface 52. For example, the recording section 49 is displaced by a mechanism such as a rack and pinion or a ball screw.

The recording position P1 is a position where the recording section 49 performs recording on the medium M1. That is, the recording position P1 is a position at which liquid is ejected onto the medium M1 supported by the support section 45. The recording position P1 is a position of the recording section 49 indicated by a solid line in FIG. 5. At the recording position P1, the recording section 49 approaches the support section 45.

The retreat position P2 is a position at which the recording section 49 is retreated from the support section 45. That is, the retreat position P2 is a position separated from the support section 45 compared to the recording position P1. Therefore, the gap between the support section 45 and the recording section 49 located at the retreat position P2 is larger than the gap between the support section 45 and the recording section 49 located at the recording position P1. The retreat position P2 is a position of the recording section 49 indicated by two dot chain line in FIG. 5.

The retreat position P2 may include a position at which the recording section 49 is replaced by the user and a position at which maintenance is performed by a maintenance section 55 described below. In this case, the position at which the recording section 49 is replaced may be a position closer to the exposure port 25 than the position at which maintenance is performed.

The recording section 49 is positioned to be exposed from the exposure port 25 when a stacking section 71, described later, is in an open state. For example, the recording section 49 is exposed from the exposure port 25 at both the recording position P1 and the retreat position P2. It is preferred that, in the recording section 49, the head control section 53 and the joint 54 may be exposed from the exposure port 25. In this case, the user can easily access the head control section 53 and the joint 54 through the exposure port 25. This is because the head control section 53 and the joint 54 are located above the head 50. The user can easily replace the recording section 49.

The recording section 49 overlaps the support section 45 when viewed from the second direction D2. Specifically, when viewed from the second direction D2, the head 50 overlaps the transport belt 46. For example, when viewed from the second direction D2, the head 50 positioned at the recording position P1 overlaps the transport belt 46. When viewed from the second direction D2, the head 50 positioned at the retreat position P2 also overlaps the transport belt 46.

The device main body 12 includes the maintenance section 55. The maintenance section 55 is configured to perform maintenance on the recording section 49. The maintenance section 55 performs maintenance of the head 50. Specifically, the maintenance section 55 performs maintenance of the head 50 by flushing, capping, cleaning, or the like. The flushing is an operation in which the head 50 appropriately ejects liquid from the nozzles 51. A clogging of the nozzles 51 is suppressed by the flushing. The maintenance section 55 receives the liquid by flushing. The capping is an operation of moisturizing the nozzles 51. The clogging of the nozzles 51 is suppressed by the capping. The maintenance section 55 forms a space communicating with the nozzle 51 by coming into contact with the head 50. The cleaning is an operation of discharging the liquid from the nozzle 51. By the cleaning, the foreign matter is discharged from the head 50 together with the liquid. The maintenance section 55 discharges the liquid from the nozzle 51 by suction.

The maintenance section 55 is configured to be displaceable. The maintenance section 55 is displaced by, for example, a rack and pinion, a ball screw, or the like. The maintenance section 55 is located at the maintenance position when the recording section 49 is maintained. The maintenance position is a position between the support section 45 and the recording section 49. At the maintenance position, the maintenance section 55 faces the ejection surface 52. The maintenance section 55 is located at the standby position when maintenance of the recording section 49 is not performed. The standby position is a position retreated from between the support section 45 and the recording section 49. The maintenance section 55 shown in FIG. 5 is located at the standby position.

A waste liquid tank 56 may be mounted on the device main body 12. The waste liquid tank 56 is a tank that stores liquid discharged by maintenance. The waste liquid tank 56 is coupled to the maintenance section 55. The waste liquid tank 56 stores liquid received by the maintenance section 55 due to flushing, cleaning, or the like. For example, the waste liquid tank 56 is replaceable.

The waste liquid tank 56 overlaps the maintenance section 55 when viewed from the second direction D2. Specifically, the waste liquid tank 56 overlaps with the maintenance section 55 located at the standby position when viewed from the second direction D2. The waste liquid tank 56 may overlap the maintenance section 55 located at the maintenance position when viewed from the second direction D2. The waste liquid tank 56 is mounted on the device main body 12 such that the waste liquid tank 56 overlaps the maintenance section 55 when viewed from the second direction D2.

The device main body 12 includes the liquid supply section 57. The liquid supply section 57 is configured to supply a liquid to the recording section 49. The liquid supply section 57 is coupled to the recording section 49. The liquid supply section 57 is coupled to the joint 54. The liquid supply section 57 is positioned between the third frame 34 and the transport section 43 when viewed from the first direction D1. That is, in the first direction D1, the gap between the third frame 34 and the liquid supply section 57 is smaller than the gap between the third frame 34 and the transport section 43. Therefore, the transport section 43 is close to the second side surface 19, whereas the liquid supply section 57 is close to the first side surface 18.

The liquid supply section 57 includes a mounting section 58. The mounting section 58 is configured such that one or more containers 59 are mounted thereon. In one example, four containers 59 are mounted on the mounting section 58. Specifically, the four containers 59 are mounted on the mounting section 58 to be arranged in the second direction D2. The container 59 is configured to contain a liquid. The container 59 is, for example, an ink cartridge. Four containers 59 respectively contain different types of liquids. Four containers 59 respectively contain liquids of different colors.

The container 59 overlaps the recording section 49 when viewed from the second direction D2. Specifically, the container 59 overlaps the head 50 positioned at the recording position P1 when viewed from the second direction D2. The container 59 also overlaps the head 50 located at the retreat position P2 when viewed from the second direction D2. The container 59 is mounted on the mounting section 58 such that the container 59 overlaps the recording section 49 when viewed from the second direction D2.

The container 59 overlaps the support section 45 when viewed from the second direction D2. That is, the container 59 is mounted on the mounting section 58 such that the container 59 overlaps the support section 45 when viewed from the second direction D2.

The mounting section 58 includes a reserve section 60. The reserve section 60 is configured such that the container 59 is mounted thereon. The reserve section 60 is configured to store the liquid supplied from the container 59. The reserve section 60 individually stores a plurality of types of liquids supplied from the plurality of containers 59. The reserve section 60 is positioned below the container 59.

The reserve section 60 stores the liquid such that the liquid level is positioned at the reference position L1. The reserve section 60 receives the liquid from the container 59 so that the liquid level is maintained at the reference position L1. For example, the inside of the reserve section 60 is opened to the atmosphere. The liquid is automatically supplied from the container 59 to the reserve section 60 by the atmospheric pressure. In the reserve section 60, when the liquid level falls below the reference position L1, the liquid is supplied from the container 59 to the reserve section 60. When the liquid level reaches the reference position L1, the supply of the liquid from the container 59 to the reserve section 60 is stopped.

The reference position L1 is located below the head 50. Specifically, the reference position L1 is located below the ejection surface 52. The reserve section 60 supplies the liquid by a water head difference from the recording section 49. Therefore, when the reference position L1 is located below the ejection surface 52, the pressure in the head 50 becomes negative. Accordingly, a meniscus is formed in the nozzle 51. Therefore, the head 50 can appropriately eject the liquid.

The mounting section 58 includes a relay member 61. The relay member 61 is a member that relays between the reserve section 60 and the recording section 49. The relay member 61 is, for example, a flow path member in which a resin plate is attached to a resin base material in which a groove is formed. The relay member 61 is couples to the reserve section 60. The liquid stored in the reserve section 60 flows through the relay member 61. The relay member 61 extends below the reserve section 60. The relay member 61 extends in the first direction D1. The relay member 61 extends toward the rear of the reserve section 60 below the reserve section 60.

The liquid supply section 57 includes the flow path 62. The liquid flows through the flow path 62. The flow path 62 is a flexible tube. For example, the flow path 62 is a multiple tube through which a plurality of kinds of liquids flow. The flow path 62 may be constituted by a plurality of aligned tubes in the same orientation. The flow path 62 is coupled to the mounting section 58 and the recording section 49. Specifically, the flow path 62 is coupled to the relay member 61 and the joint 54.

The flow path 62 includes a first end portion 63 and a second end portion 64. The first end portion 63 is coupled to the mounting section 58. Specifically, the first end portion 63 is coupled to the relay member 61. The second end portion 64 is coupled to the recording section 49. Specifically, the second end portion 64 is coupled to the joint 54. Therefore, the gap between the first end portion 63 and the mounting section 58 is smaller than the gap between the first end portion 63 and the recording section 49. The gap between the second end portion 64 and the recording section 49 is smaller than the gap between the second end portion 64 and the mounting section 58.

The first end portion 63 and the second end portion 64 are positioned to sandwich the center of the mounting section 58 when viewed from the first direction D1. For example, the first end portion 63 is located on the side opposite to the second direction D2 with respect to the center line L2. The center line L2 is an imaginary line that divides the mounting section 58 into two in the second direction D2. The center line L2 extends in the vertical direction D3. The center line L2 is an imaginary line passing through the center position of the mounting section 58 in the second direction D2. The second end portion 64 is located on the second direction D2 side of the center line L2. That is, the first end portion 63 and the second end portion 64 are positioned to sandwich the center line L2 in the second direction D2. As a result, the degree of bending of the flow path 62 is reduced. If both the first end portion 63 and the second end portion 64 are located on the second direction D2 side of the center line L2, the degree of bending of the flow path 62 is increased. In this case, there is risk that the flow path 62 is bent at an acute angle. When the flow path 62 is constituted by a plurality of tubes, it is preferred that, the first end portion 63 and the second end portion 64 of at least one of the plurality of tubes is positioned to sandwich the center line L2.

The flow path 62 has an upper portion 65. The upper portion 65 is a portion including the top of the flow path 62. That is, the upper portion 65 includes a portion of the flow path 62 located at the vertex. The upper portion 65 is a portion located between the first end portion 63 and the second end portion 64. The upper portion 65 includes a portion that is bent to be convex upward.

The flow path 62 overlaps the discharge space S1, when viewed from the first direction D1. Specifically, when viewed from the first direction D1, the upper portion 65 overlaps the discharge space S1. The upper portion 65 is positioned in a flow path space A3, described later. When viewed from the first direction D1, since the flow path 62 overlaps the discharge space S1, the degree of bending of the flow path 62 is reduced as compared to a case where the flow path 62 does not overlap the discharge space S1, for example, a case where the flow path 62 is housed below the discharge space S1. When the flow path 62 is housed below the discharge space S1, it is conceivable to increase the frame space A1, in the vertical direction D3, in order to reduce the degree of bending of the flow path 62. In this case, there is a concern that the device main body 12 creases in size in the vertical direction D3. However, since the flow path 62 is positioned to overlap the discharge space S1, the concern that the device main body 12 increases in size in the vertical direction D3 is reduced.

The flow path 62 overlaps the mounting section 58, when viewed from the first direction D1. Specifically, when viewed from the first direction D1, a portion of the flow path 62 including the first end portion 63 overlaps the reserve section 60. The flow path 62 extends upward from the relay member 61. The flow path 62 extends straight upward at the rear of the reserve section 60. The flow path 62 extends upward from the first end portion 63 toward the second end portion 64 and then extends in the second direction D2. The flow path 62 extends along the second frame 33. Specifically, the flow path 62 extends along the frame wall 35 from the first end portion 63 to the second end portion 64.

The flow path 62 overlaps the container 59, when viewed from the first direction D1. That is, the container 59 is mounted on the mounting section 58 such that the flow path 62 overlaps the container 59, when viewed from the first direction D1. For example, when viewed from the first direction D1, a portion of the flow path 62 between the first end portion 63 and the upper portion 65 overlaps the container 59.

The liquid supply section 57 overlaps the waste liquid tank 56, when viewed from the second direction D2. Specifically, when viewed from the second direction D2, the mounting section 58 overlaps the waste liquid tank 56. More specifically, when viewed from the second direction D2, the reserve section 60 overlaps the waste liquid tank 56. That is, the waste liquid tank 56 is mounted on the device main body 12 such that the reserve section 60 overlaps the waste liquid tank 56.

The liquid supply section 57 overlaps the maintenance section 55, when viewed from the second direction D2. Specifically, when viewed from the second direction D2, the mounting section 58 overlaps the maintenance section 55. More specifically, when viewed from the second direction D2, the reserve section 60 overlaps the maintenance section 55. For example, when viewed from the second direction D2, the reserve section 60 overlaps the maintenance section 55 located at the standby position. When viewed from the second direction D2, the reserve section 60 may overlap the maintenance section 55 located at the maintenance position.

The liquid supply section 57, when viewed from the second direction D2, may overlap the recording section 49. The liquid supply section 57, when viewed from the second direction D2, may overlap the recording section 49 located at the recording position P1, or may overlap the recording section 49 located at the retreat position P2. For example, the mounting section 58, when viewed from the second direction D2, may overlap the recording section 49. For example, the reserve section 60, when viewed from the second direction D2, overlaps the recording section 49. Specifically, when viewed from the second direction D2, the reserve section 60 overlaps the head 50 in a state where the reference position L1 is located below the ejection surface 52.

As shown in FIG. 1, the device main body 12 includes the stacking section 71. The stacking section 71 receives medium M1 discharged from the housing 15. Therefore, the recorded medium M1 are stacked on the stacking section 71. The stacking section 71 receives the medium M1 discharged to the discharge space S1. That is, the medium M1 to be discharged to the discharge space S1 are stacked on the stacking section 71. The stacking section 71 is, for example, a stacker.

The stacking section 71 is attached to the housing 15. The stacking section 71 is supported by the frame section 31. The stacking section 71 is housed in the recess section 20. For example, the stacking section 71 closes the exposure port 25 by being attached to the housing 15.

The stacking section 71 may be configured to be displaced between an open state and a closed state. The open state is a state in which the exposure port 25 is exposed. The closed state is a state in which the exposure port 25 is closed. For example, the stacking section 71 is detachably attached to the housing 15. The stacking section 71 is attached to and detached from the housing 15 to open the exposure port 25 and to be closed the exposure port 25. The stacking section 71 closes the exposure port 25 to separate the inside of the housing 15 from the outside of the housing 15. For example, the stacking section 71 may open and close the exposure port 25 by opening and closing or sliding with respect to the housing 15.

The stacking section 71 is positioned above the recording section 49. The stacking section 71 is positioned above the mounting section 58. The stacking section 71, when viewed from the vertical direction D3, overlaps the reading section 13. The stacking section 71 is positioned directly below the reading section 13.

Figure 6:
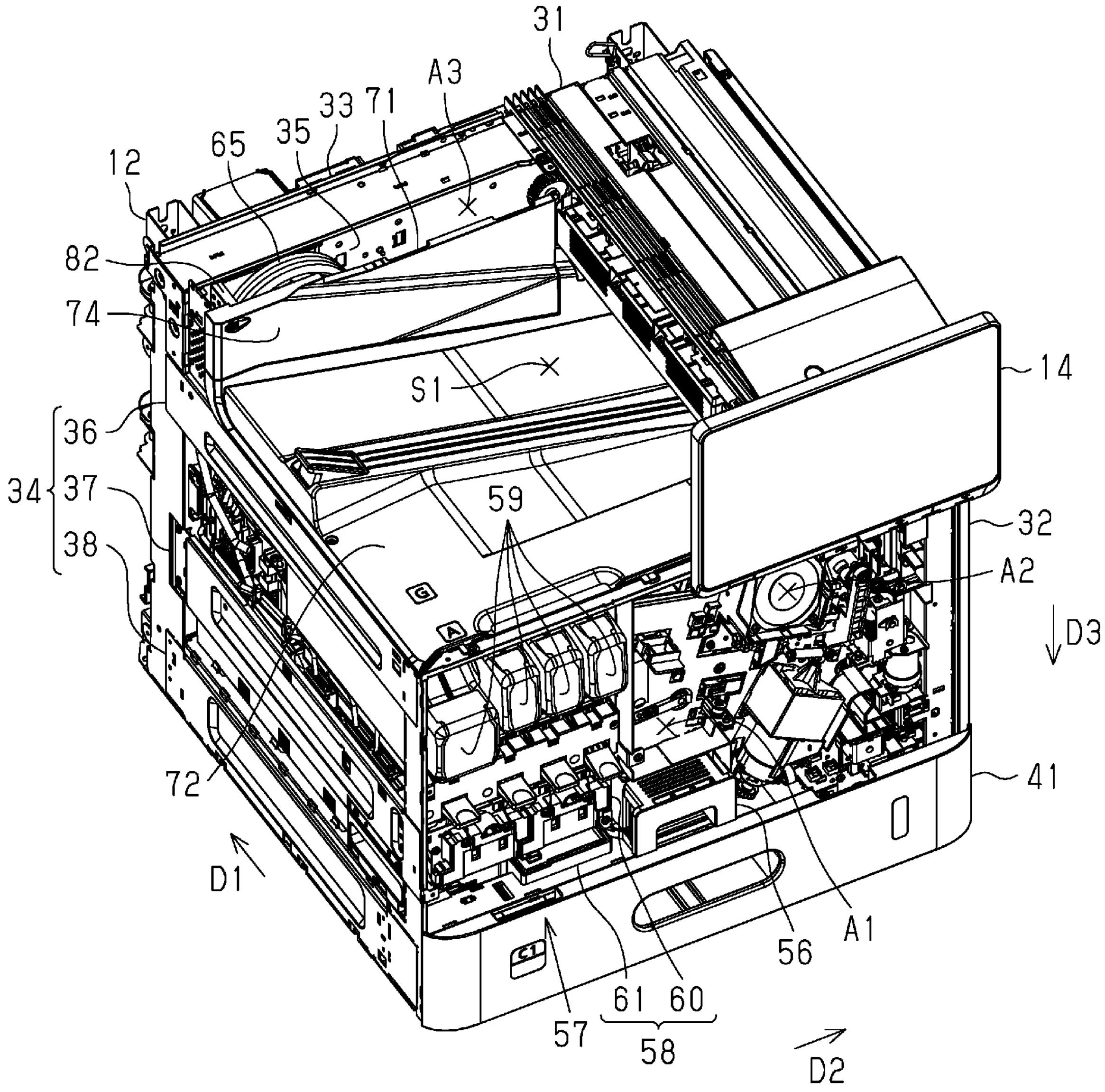
FIG. 6 is a perspective view of the recording device shown in FIG. 4 to which a stacking section is attached.

As shown in FIG. 6, the stacking section 71 defines an accommodative space A2 and a flow path space A3. The accommodative space A2 and the flow path space A3 are parts of the frame space A1. The accommodative space A2 is a space in which various components of the device main body 12 are housed. The flow path space A3 is a space in which the flow path 62 is housed. The accommodative space A2 and the flow path space A3 communicate with each other. The accommodative space A2 is defined by the stacking section 71, the first frame 32, and the second frame 33. The flow path space A3 is defined by the stacking section 71 and the second frame 33. For example, the flow path space A3 is defined by the stacking section 71, the second frame 33, and the reading section 13. The flow path space A3 is a space sandwiched between the stacking section 71 and the second frame 33. The flow path space A3 is positioned between the stacking section 71 and the second frame 33 in the first direction D1. When viewed from the first direction D1, the flow path space A3 overlaps the discharge space S1.

The accommodative space A2 communicates with the air vent port 24. Therefore, air flows into the accommodative space A2 from the outside of the housing 15 or air flows out of the accommodative space A2 to the outside of the housing 15, through the air vent port 24. The present disclosure is not limited to this, and air may enter and exit the accommodative space A2 through gaps in the housing 15.

The flow path space A3 communicates with the through hole 23. Therefore, air flows into the flow path space A3 from the outside of the housing 15 and air flows out of the housing 15 from the flow path space A3, through the through hole 23. The present disclosure is not limited thereto, and the air may enter and exit the flow path space A3 through gaps in the housing 15.

The flow path space A3 is a space in which the flow path 62 is located. Specifically, the flow path space A3 is a space in which the upper portion 65 is located. That is, a portion that is bent of the flow path 62 is positioned in the flow path space A3. Therefore, the stacking section 71, the second frame 33, and the reading section 13 surround the upper portion 65. Thus, the flow path 62 is protected. Since the flow path 62 is positioned in the flow path space A3, the degree of bending of the flow path 62 is reduced as compared with a case where the flow path 62 is housed only in the accommodative space A2.

Figure 7:
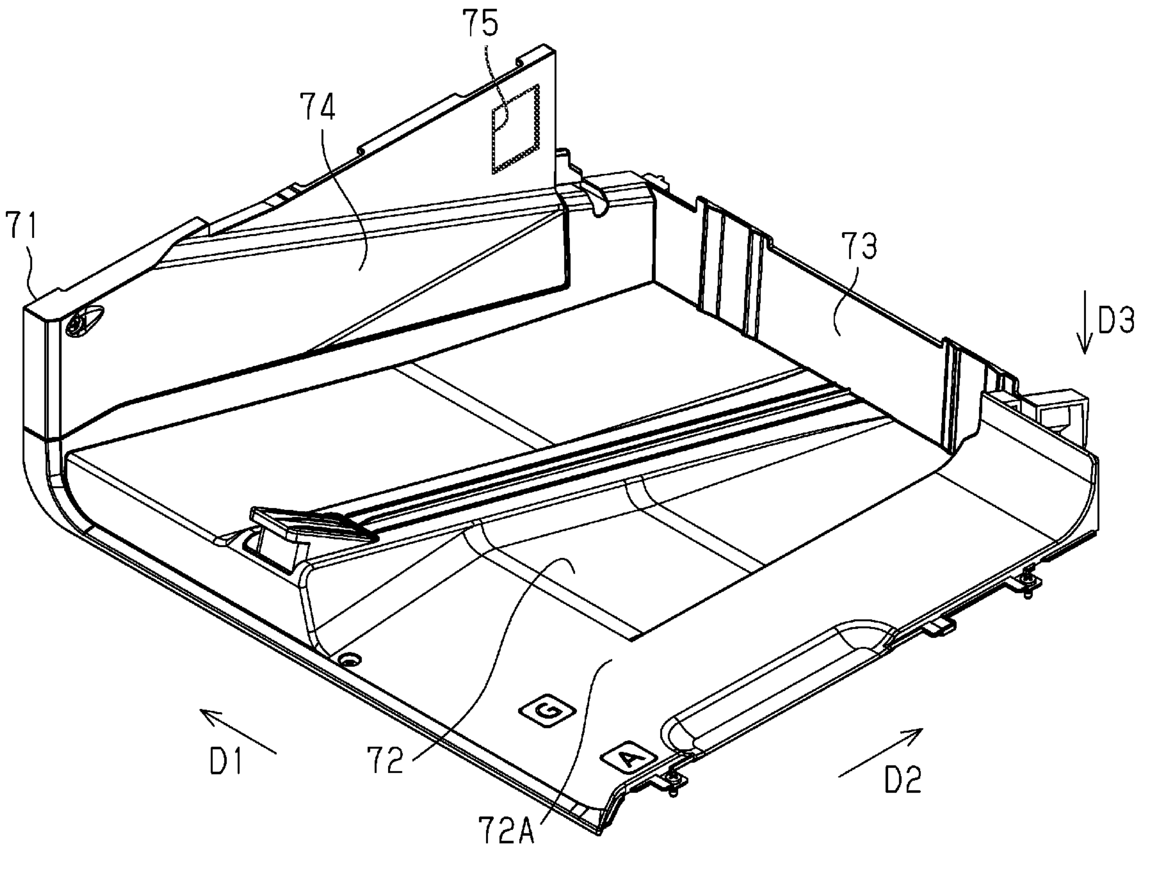
FIG. 7 is a perspective view of the stacking section.

As shown in FIG. 7, the stacking section 71 includes a stacking board 72. The stacking board 72 is a portion that receives the medium M1 discharged to the discharge space S1. For example, the stacking board 72 is inclined downward in the second direction D2. The stacking board 72 partitions the accommodative space A2 and the discharge space S1. Specifically, the stacking board 72 partitions the accommodative space A2 and the discharge space S1 in the vertical direction D3. The discharge space S1 is located above the stacking board 72. The accommodative space A2 is located below the stacking board 72. Therefore, since the flow path 62 is positioned in the flow path space A3, the stacking board 72 is positioned below the upper portion 65.

The stacking section 71 has a stacking surface 72A. The stacking surface 72A is a surface of the stacking board 72 that receives the medium M1. The stacking surface 72A is a surface of the stacking board 72 that faces upward. The stacking board 72 is not limited to a single plate and may be formed of a plurality of members. Also in this case, the stacking surface 72A is the upper surface of the stacking board 72.

The stacking section 71 includes an alignment plate 73. The alignment plate 73 extends upward from the stacking board 72. Specifically, the alignment plate 73 extends upward from an end portion on the second direction D2 on the stacking board 72. The alignment plate 73 extends in the first direction D1 and the vertical direction D3. The alignment plate 73 partitions the accommodative space A2 and the discharge space S1. Specifically, the alignment plate 73 partitions the accommodative space A2 and the discharge space S1 in the second direction D2.

The alignment plate 73 aligns medium M1 stacked on the stacking board 72 by coming into contact with medium M1. Specifically, when the medium M1 are discharged onto the stacking section 71, the medium M1 slide in the second direction D2 along the inclined stacking board 72. As a result, the base end of the medium M1 comes into contact with the alignment plate 73. As a result, the base ends of the medium M1 are aligned. Thus, the medium M1 is aligned.

The stacking section 71 includes a partitioning board 74. The partitioning board 74 extends from the stacking board 72. For example, the partitioning board 74 extends from the stacking board 72 and the alignment plate 73. The partitioning board 74 extends upward from the stacking board 72. Specifically, the partitioning board 74 extends upward from an end portion of the stacking board 72 on the first direction D1 side. The partitioning board 74 spreads in the second direction D2 and the vertical direction D3. The partitioning board 74 defines a flow path space A3. The partitioning board 74 partitions the flow path space A3 and the discharge space S1. Specifically, the partitioning board 74 partitions the flow path space A3 and the discharge space S1 in the first direction D1. The discharge space S1 is located on the side opposite to the first direction D1 with respect to the partitioning board 74. The flow path space A3 is located on the first direction D1 side of the partitioning board 74. Therefore, because the flow path 62 is positioned in the flow path space A3, the partitioning board 74, when viewed from the first direction D1, overlaps the upper portion 65.

A partitioning board opening 75 may be formed in the stacking section 71. The partitioning board opening 75 is opened in the partitioning board 74. The inside and outside of the housing 15 communicate with each other through the partitioning board opening 75. Specifically, the discharge space S1 and the flow path space A3 in the housing 15 communicate with each other through the partitioning board opening 75. Through the partitioning board opening 75, air flows into the flow path space A3 from the outside of the housing 15, and air flows out from the flow path space A3 to the outside of the housing 15. Air flows into and out of the housing 15 through the through hole 23, the air vent port 24, and the partitioning board opening 75. The air may flow into and out of the housing 15 not only through the through hole 23, the air vent port 24, and the partitioning board opening 75, but also through a gap in the housing 15.

The stacking section 71 does not overlap the flow path 62 when viewed from the vertical direction D3. Specifically, the stacking board 72, when viewed in the vertical direction D3, does not overlap the upper portion 65. That is, the stacking surface 72A, when viewed in the vertical direction D3, does not overlap with the upper portion 65. Accordingly, the risk that the flow path 62 interferes with the medium M1 stacked on the stacking board 72 is reduced.

Figure 8:
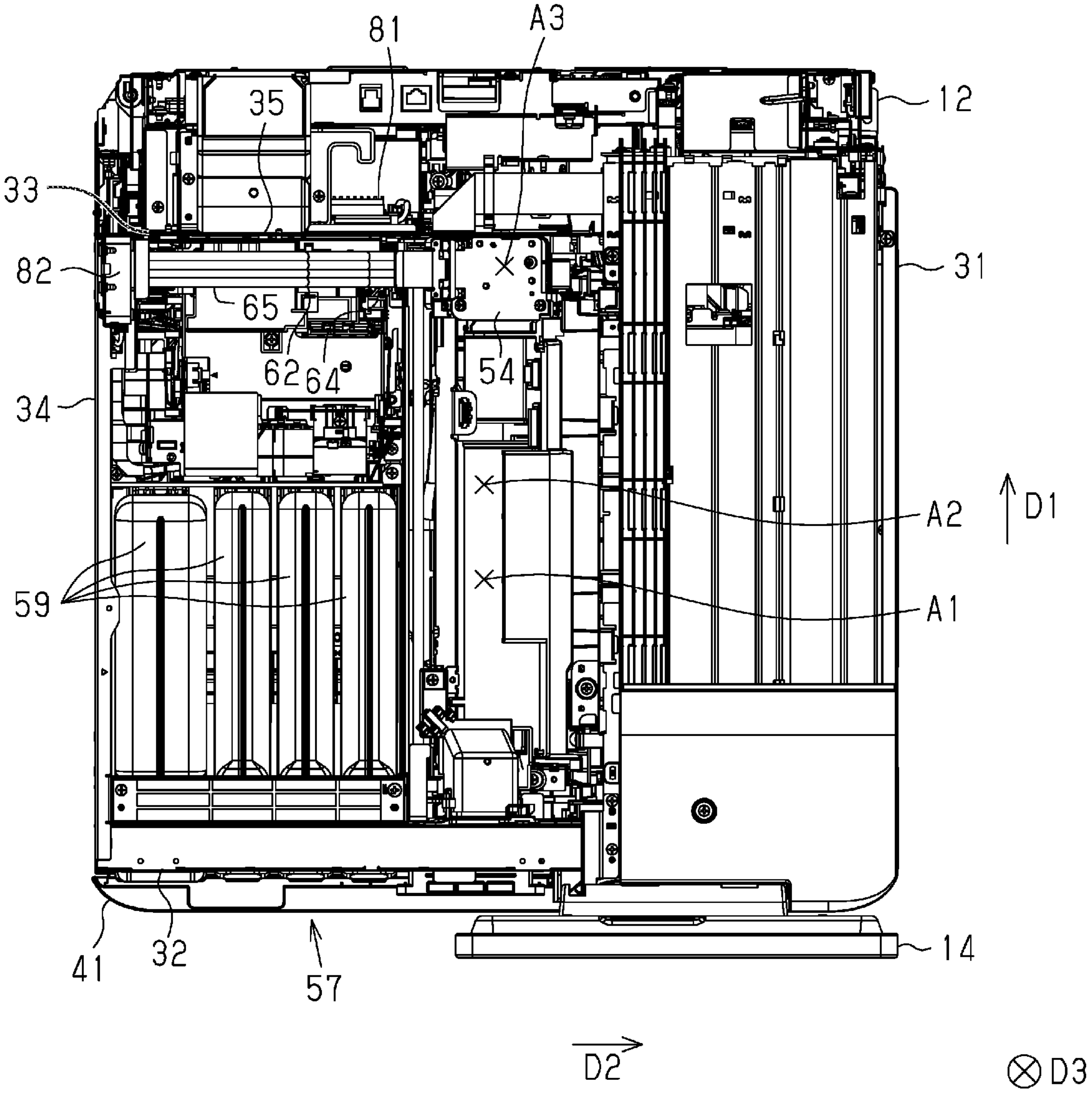
FIG. 8 is a plan view of the recording device shown in FIG. 4.
Figure 9:
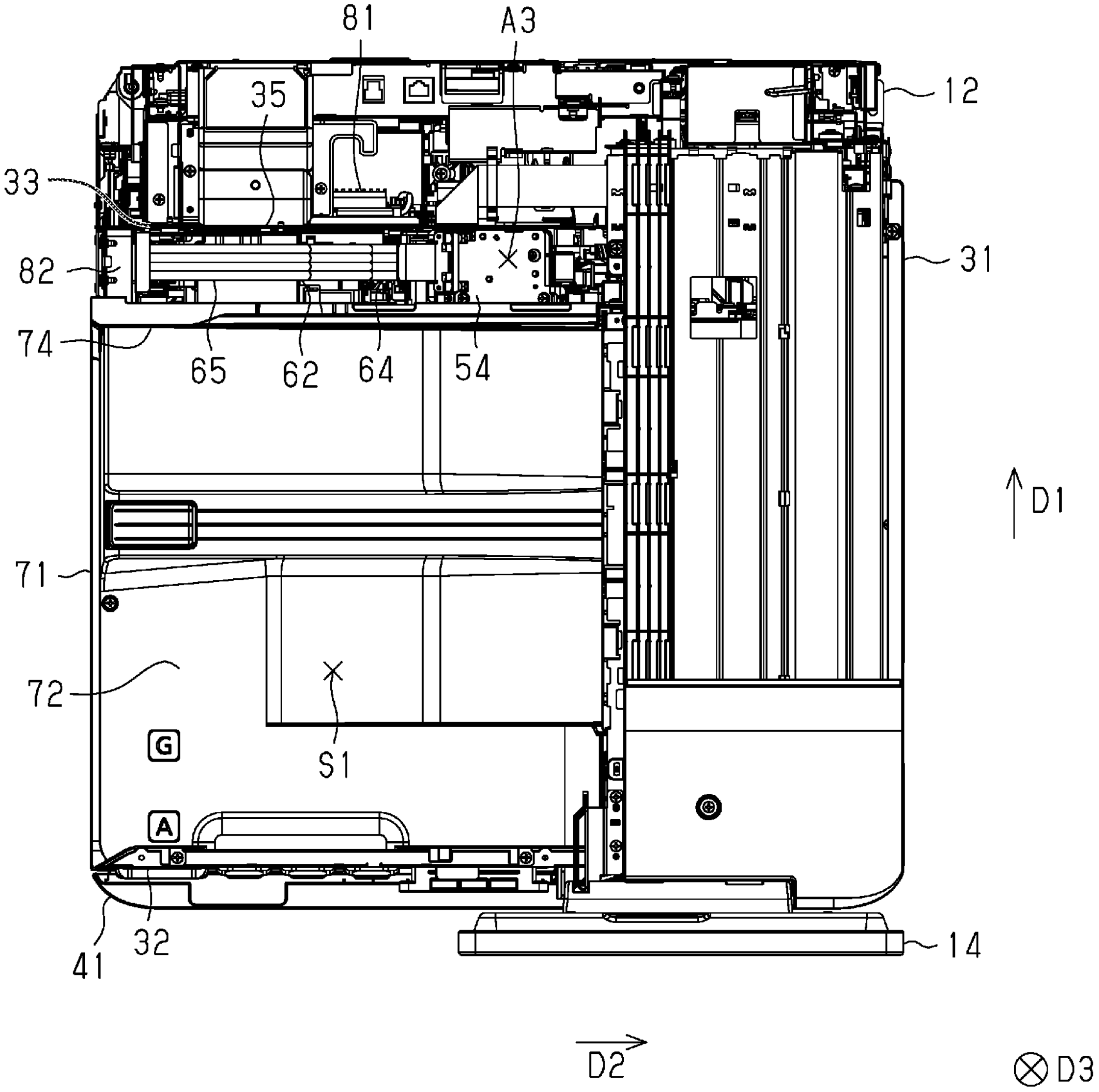
FIG. 9 is a plan view of the recording device shown in FIG. 6.

As shown in FIGS. 8 and 9, the device main body 12 includes the circuit board 81. The circuit board 81 may be a power circuit board that controls power supplied to the device main body 12 or may be a control circuit board that controls driving of the device main body 12.

The circuit board 81 is mounted on the frame section 31. Specifically, the circuit board 81 is mounted on the second frame 33. For example, the circuit board 81 is fixed not to be displaced with respect to the second frame 33. For example, the circuit board 81 may be mounted so in open and close with respect to the second frame 33.

Figure 10:
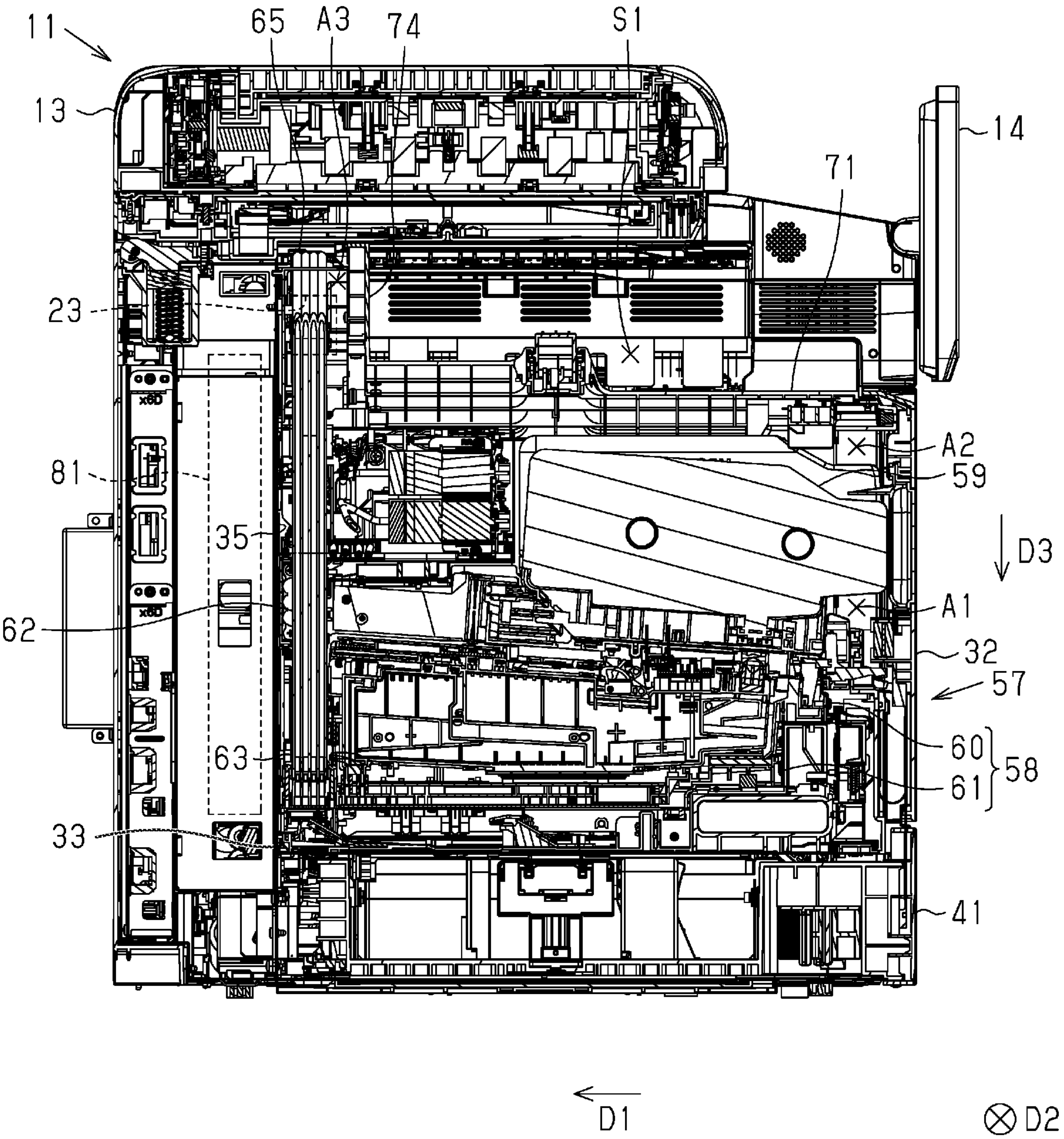
FIG. 10 is a side sectional view of the recording device.

As shown in FIG. 10, the circuit board 81 is positioned along the frame wall 35. The circuit board 81 may be positioned to be in close contact with the frame wall 35 or may be positioned to be spaced apart from the frame wall 35. The circuit board 81 is located outside the frame space A1. The circuit board 81 is positioned in the first direction D1 side more than the frame wall 35. The circuit board 81 and the liquid supply section 57 are located to sandwich the frame wall 35 in the first direction D1. That is, the frame wall 35, when viewed from the second direction D2, is positioned between the circuit board 81 and the liquid supply section 57. In other words, the frame wall 35, when viewed from the vertical direction D3, is positioned between the circuit board 81 and the liquid supply section 57. Therefore, the circuit board 81 is close to the liquid supply section 57. In particular, the circuit board 81 is close to the flow path 62.

The circuit board 81 is positioned on a side in the first direction D1 with respect to the stacking section 71, the flow path 62, and the second frame 33. Specifically, the partitioning board 74, the flow path 62, the second frame 33, and the circuit board 81 are arranged in this order in the first direction D1. More specifically, the partitioning board 74, the flow path 62, the frame wall 35, and the circuit board 81 are arranged in this order in the first direction D1.

Figure 11:
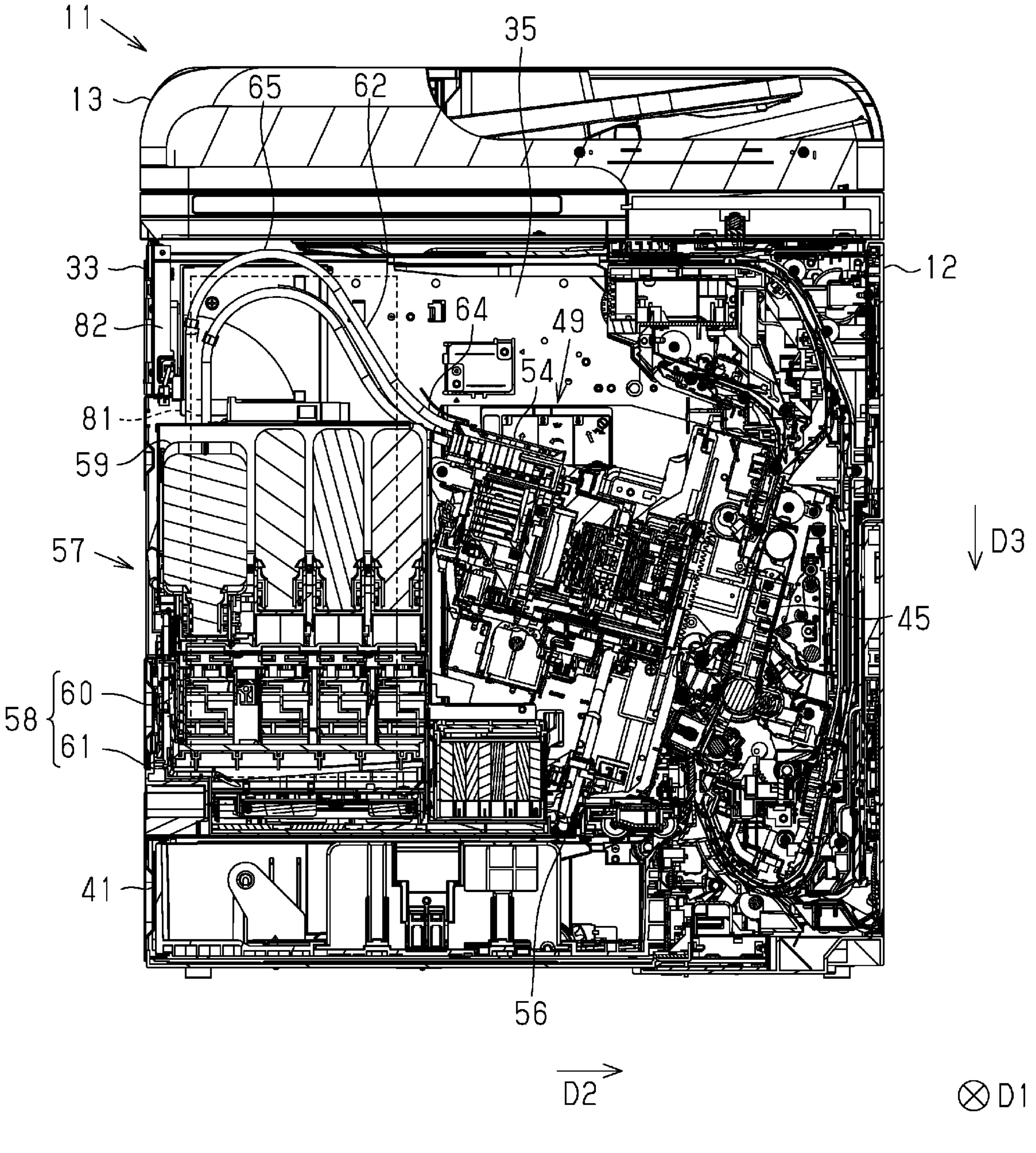
FIG. 11 is a cross sectional view of the recording device in which the recording section is located at the retreat position and the stacking section is removed.
Figure 12:
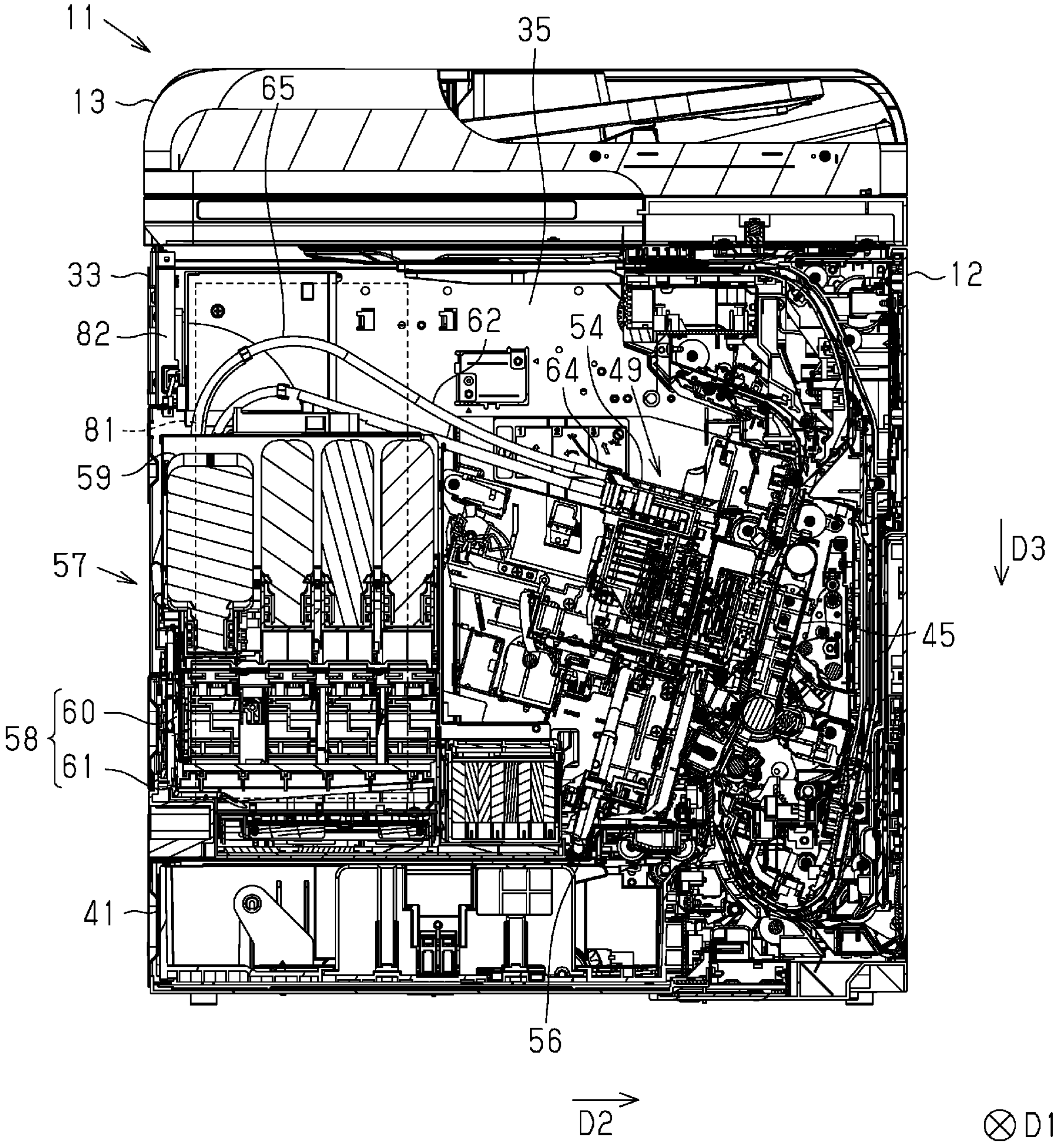
FIG. 12 is a cross sectional view of the recording device shown in FIG. 11 with the recording section displaced to the recording position.

As shown in FIGS. 11 and 12, the circuit board 81, when viewed from the first direction D1, overlaps the second frame 33. Specifically, the circuit board 81, when viewed from the first direction D1, overlaps the frame wall 35.

The circuit board 81, when viewed from the first direction D1, overlaps the liquid supply section 57. For example, the circuit board 81 overlaps with not only the liquid supply section 57 but also the container 59. The circuit board 81, for example, when viewed from the first direction D1, overlaps the reserve section 60, the relay member 61, and the flow path 62.

Figure 13:
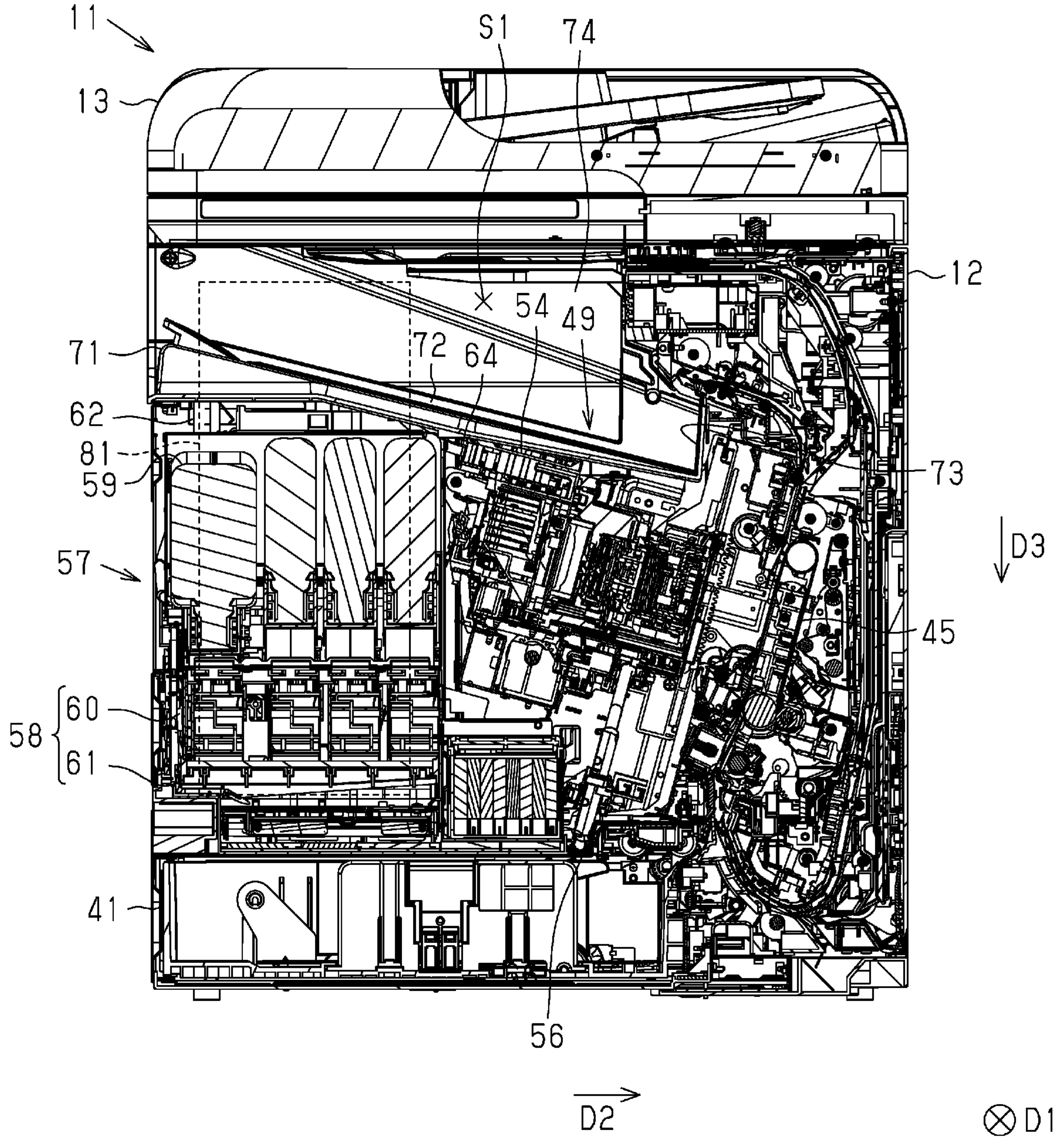
FIG. 13 is a cross sectional view of the recording device in which the recording section is located at the retreat position and the stacking section is attached.
Figure 14:
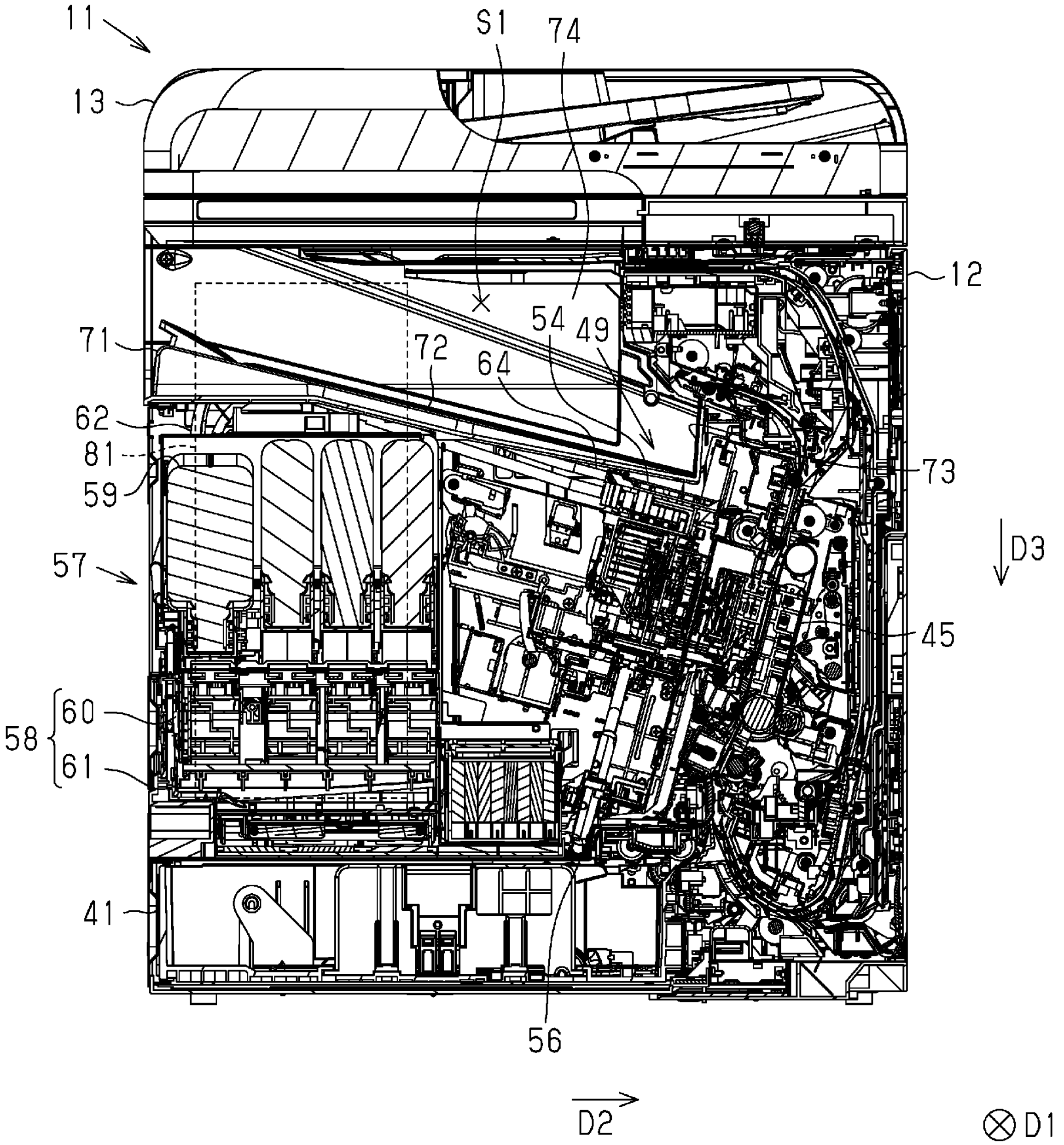
FIG. 14 is a cross sectional view of the recording device shown in FIG. 13 with the recording section displaced to the recording position.

As shown in FIGS. 13 and 14, the circuit board 81, when viewed from the first direction D1, overlaps the stacking section 71. Specifically, the circuit board 81, when viewed from the first direction D1, overlaps the partitioning board 74. Therefore, the circuit board 81, when viewed from the first direction D1, overlaps the discharge space S1. That is, the circuit board 81, when viewed from the first direction D1, overlaps the flow path space A3. For example, the circuit board 81, when viewed from the first direction D1, also overlaps the accommodative space A2.

The circuit board 81 generates heat. Since the circuit board 81 is mounted on the frame, heat of the circuit board 81 easily reaches the frame space A1. In particular, the heat of the circuit board 81 easily reaches the liquid supply section 57. This is because the gap between the circuit board 81 and the liquid supply section 57 is small. When heat reaches the liquid supply section 57, there is a risk that the liquid may be heated. In this case, there is a risk that the recording section 49 cannot normally eject liquid.

Heat of the circuit board 81 easily reaches the reserve section 60, the relay member 61, the flow path 62, and the like which are positioned in the accommodative space A2. In particular, because the circuit board 81 is positioned along the frame wall 35, the heat of the circuit board 81 easily reaches the flow path 62 that is along the frame wall 35. In particular, because the heated air tends to stay above, heat of the circuit board 81 tends to stay in the flow path space A3. That is, the heat of the circuit board 81 is likely to reach the upper portion 65. In this respect, the flow path space A3 communicates with the outside of the housing 15 through the through hole 23. This reduces the risk that heat of the circuit board 81 stays in the flow path space A3. Therefore, the risk that the liquid supply section 57 is heated is reduced. In addition, in the frame space A1, the heat flows through the through hole 23 with the air vent port 24 or flows through the through hole 23 with the partitioning board opening 75, thereby reducing the risk of heat accumulation. The flow path 62 and the second frame 33 are cooled by the air flowing through the flow path space A3 and the frame space A1 in this way. When the second frame 33 is cooled, heat transfer from the circuit board 81 to the flow path 62 via the second frame 33 is suppressed. In addition, the circuit board 81 is cooled by cooling the second frame 33.

As shown in FIG. 3, the device main body 12 includes a fan 82. The fan 82 is mounted on the frame section 31. The fan 82 is mounted on, for example, the second frame 33. The fan 82 is located in the flow path space A3. The fan 82 is positioned to communicate with the through hole 23. For example, the fan 82, when viewed from the second direction D2, overlaps with the through hole 23. Thus, when the fan 82 is driven, the air can easily flow in the flow path space A3.

The fan 82 is driven to cause air to flow out of the housing 15 through the through hole 23. That is, the fan 82 exhausts air from the inside of the housing 15 to the outside of the housing 15. The fan 82 exhausts air from the flow path space A3 to the outside of the housing 15 through the through hole 23. As a result, air flows into the flow path space A3 through the air vent port 24 and the accommodative space A2. Further, air flows into the flow path space A3 through the partitioning board opening 75. When the fan 82 is driven, air may flow into the flow path space A3 through the clearance of the housing 15. For example, when the fan 82 is driven, air flows, so as to flow from the recording section 49 toward the mounting section 58, from the partitioning board opening 75 to the through hole 23. In this case, because the recording section 49 is actively cooled, the recording section 49 can easily eject the liquid normally.

The fan 82 may be driven to cause air to flow into the housing 15 via the through hole 23. The fan 82 takes air into the housing 15 from the outside of the housing 15. The fan 82 takes air into the flow path space A3 from the outside of the housing 15 via the through hole 23. As a result, air flows out from the flow path space A3 via the air vent port 24 and the accommodative space A2. Further, the air flows out from the flow path space A3 via the partitioning board opening 75. When the fan 82 is driven, air may flow out from the flow path space A3 via the clearance of the housing 15.

Operation and Effect

Next, the operation and effects of the above embodiment will be described.

1: The flow path 62, when viewed from the first direction D1, overlaps the discharge space S1. According to the above-described configuration, the housing 15 is reduced in size in the vertical direction D3 as compared to a case where the flow path 62 is housed below the discharge space S1. Therefore, the risk that the housing 15 increase in size in the vertical direction D3, is reduced.

2: The recording section 49 is positioned below the discharge space S1. Normally, in the housing 15, a space below the discharge space S1 is larger than a space, when viewed from the first direction D1, overlapping the discharge space S1. According to the above-described configuration, because the recording section 49 is positioned in a large space, it is easy for the recording section 49 to record an image on the medium M1.

3: When viewed from the first direction D1, the center of the mounting section 58 is located between the first end portion 63 and the second end portion 64. According to the above-described configuration, when viewed from the first direction D1, as compared to a case where the center of the mounting section 58 is not positioned between the first end portion 63 and the second end portion 64 the possibility that the degree of bending of the flow path 62 increases is reduced.

4: The flow path 62, when viewed from the first direction D1, overlaps the mounting section 58. According to the above-described configuration, when viewed from the first direction D1, compared to a case where the flow path 62 does not overlap the mounting section 58 a concern that the degree of bending of the flow path 62 increases is reduced.

5: The recording section 49 is configured to be displaced between a recording position P1 and a retreat position P2. According to the above-described configuration, because the recording section 49 is positioned at the retreat position P2, the user can easily access the recording section 49.

6: The liquid level of the reserve section 60 is located at a position lower than the ejection surface 52. According to the above-described configuration, the inside of the recording section 49 is maintained at a negative pressure by the pressure difference between the liquid level in the reserve section 60 and the ejection surface 52. Accordingly, the recording section 49 can discharge the liquid in a stable state.

7: The upper portion 65, when viewed from the vertical direction D3, does not overlap the stacking surface 72A. According to the above-described configuration, when viewed from the vertical direction D3, compared to a case where the upper portion 65 overlaps the stacking surface 72A a possibility that the medium M1 stacked on the stacking surface 72A interferes with the flow path 62 is reduced.

8: The upper portion 65 is positioned at the partitioning board 74 in the first direction D1. According to the above-described configuration, the risk that the medium M1 stacked on the stacking surface 72A interfere with the flow path 62 is reduced.

9: The head control section 53 and the joint 54 are located above the head 50 and are exposed from the exposure port 25. According to the above-described configuration, the user can access the head control section 53 and the joint 54 from the exposure port 25. An electric wire, a signal line, and the like are coupled to the head control section 53. The flow path 62 is coupled to the joint 54. The user can take out the recording section 49 from the housing 15 by removing these components. Therefore, the user can easily replace the recording section 49 from the exposure port 25.

10: The through hole 23, when viewed from front of first side surface 18, overlaps the flow path 62. The heat of the circuit board 81 may reach the flow path 62 via the second frame 33. In this regard, according to the above-described configuration, the risk that the flow path 62 is heated by the air flowing into the housing 15 through the through hole 23 or the air flowing out of the housing 15 through the through hole 23 is reduced.

11: The uppermost end of the through hole 23 is located at a position equal to or higher than the uppermost end of the circuit board 81. The air heated by the circuit board 81 tends to flow upward. Therefore, according to the above-described configuration, the air heated by the circuit board 81 flows into the housing 15 from the through hole 23 or flows together with the air flowing out of the housing 15 from the through hole 23. Thus, the risk that the air heated by the circuit board 81 to stagnate in the housing 15 is reduce. Therefore, the risk that the flow path 62 is heated by the circuit board 81 is reduced.

12: The partitioning board opening 75 communicating with the discharge space S1 is opened in the partitioning board 74. According to the above-described configuration, the air flows between the inside and the outside of the housing 15 via the partitioning board opening 75 and the through hole 23, thereby reducing the risk that the flow path 62 is heated by the circuit board 81.

13: The recording device 11 is provided with the fan 82 which causes air to flow out to the outside of the housing 15 via the through hole 23. According to the above-described configuration, the risk that the flow path 62 is heated by the circuit board 81 is reduced.

14: The recording device 11 includes the fan 82 that causes air to flow into the housing 15 via the through hole 23. According to the above-described configuration, the risk that the flow path 62 is heated by the circuit board 81 is reduced.

15: A part of the flow path 62 is surrounded by the reading section 13, the second frame 33, and the partitioning board 74. According to the above-described configuration, the part of the flow path 62 is protected by the reading section 13, the second frame 33, and the partitioning board 74.

16: The air vent port 24 is located below the through hole 23 in the first side surface 18. According to the above-described configuration, because the air flows inside and outside the housing 15 via the through hole 23 and the air vent port 24, the risk that the flow path 62 is heated by the circuit board 81 is reduced.

17: The uppermost end of the through hole 23 is located at a position equal to or higher than the uppermost end of the circuit board 81. The lowermost end of the air vent port 24 is located at a position equal to or lower than the lowermost end of the circuit board 81. According to the above-described configuration, the air flowing from the through hole 23 toward the air vent port 24 or the air flowing from the air vent port 24 toward the through hole 23 covers over the entire length of the circuit board 81. Therefore, the air can easily cool the entire circuit board 81. Therefore, the risk that the flow path 62 is heated by the circuit board 81 is reduced.

Modifications

The above-described embodiment may be modified as follows. The above-described embodiment and the following modifications can be implemented in combination with each other to the extent that there is no technical contradiction.

The stacking section 71 may be formed integrally with the housing 15. For example, the housing 15 may include the stacking board 72, the alignment plate 73, and the partitioning board 74. The housing 15 defines a discharge space S1 by the stacking board 72, the alignment plate 73, and the partitioning board 74.

The liquid ejected by the recording section 49 is not limited to ink, and may be, for example, a liquid material in which particles of a functional material are dispersed or mixed in liquid. For example, the recording section 49 may discharge a liquid material containing a material such as an electrode material or a pixel material used for manufacturing a liquid crystal display, an electroluminescence display, a surface emitting display, or the like in a dispersed or dissolved form.

Technical Ideas

Hereinafter, technical ideas grasped from the above embodiments and modifications, and operations and effects thereof, will be described.

(A) A recording device includes a recording section extending in one direction, the recording section configured to eject liquid simultaneously across an entire width of a medium, a mounting section on which a container containing a liquid is mounted, a flow path coupled to the recording section and the mounting section, and a housing that houses the recording section, the mounting section, and the flow path, wherein the housing defines a discharge space to which the medium recorded by the recording section is discharged, the discharge space is a space outside the housing, and the flow path overlaps with the discharge space when viewed from the one direction. According to the above-described configuration, the housing is downsized in the vertical direction compared to a case where the flow path is accommodated below the discharge space. Therefore, the risk that the housing is increased in size in the vertical direction is reduced.

(B) In the above-described recording device, the recording section may be positioned below the discharge space. Usually, in the housing, a space below the discharge space is larger than a space overlapping with the discharge space when viewed from one direction. According to the configuration, because the recording section is positioned in a large space, the recording section can easily record an image on the medium.

(C) In the above-described recording device, the flow path includes a first end portion coupled to the mounting section and a second end portion coupled to the recording section and when viewed from the one direction, a center of the mounting section may be located between the first end portion and the second end portion. According to the above-described configuration, compared to a case where the center of the mounting section is not positioned between the first end portion and the second end portion when viewed from the one direction, the risk that the degree of bending of the flow path increases is reduced.

(D) In the above-described recording device, the flow path may overlap with the mounting section when viewed from the one direction. According to the configuration, compared to a case where the flow path does not overlap the mounting section when viewed from one direction, the risk that the degree of bending of the flow path increases is reduced.

(E) The above-described recording device may further include a support section facing the recording section, wherein the support section supports a medium and the recording section may be displaced between a recording position at which liquid is ejected onto the medium supported by the support section and a retreat position that is further away from the support section than the recording position. According to the above configuration, the user can easily access the recording section by positioning the recording section at the retreat position.

(F) In the above-described recording device, the recording section has an ejection surface from which liquid is ejected, the mounting section includes a reserve section configured to store the liquid supplied from the container, and the reserve section may store the liquid so that a liquid level reaches a position lower than the ejection surface. According to the above configuration, the inside of the recording section is maintained at a negative pressure by the pressure difference between the liquid surface and the ejection surface in the reserve section. As a result, the recording section can eject the liquid in a stable state.

(G) The above-described recording device further includes a stacking section attached to the housing and on which medium discharged to the discharge space is stacked, wherein the stacking section has a stacking surface for receiving the medium, the flow path has an upper portion positioned above the stacking surface, and the upper portion may not overlap the stacking surface when viewed from the vertical direction. According to the above-described configuration, compared to a case where the upper portion overlaps the stacking surface when viewed from the vertical direction, the risk that the medium stacked on the stacking surface interferes with the flow path is reduced.

(H) In the above-described recording device, the stacking section includes a partitioning board extending upward from the stacking surface, the partitioning board extends in a direction perpendicular to the one direction and in a vertical direction, the discharge space is located in a direction opposite to the one direction with respect to the partitioning board, and the upper portion may be located in the one direction with respect to the partitioning board. According to the configuration, it is possible to reduce the risk that the medium loaded on the stacking surface interferes with the flow path.

(I) In the above-described recording device, an exposure port for exposing inside is opened in the housing, the stacking section is configured to be displaced between an open state in which the exposure port is exposed and a closed state in which the exposure port is closed, the recording section includes a head in which nozzles are opened, a head control section configured to control the head, and a joint to which the flow path is coupled, and the head control section and the joint may be located above the head and may be exposed from the exposure port. According to the above configuration, the user can access the head control section and the joint from the exposure port. An electric wire, a signal line, and the like are coupled to the head control section. A flow path is coupled to the joint. The user can take out the recording section from the housing by removing these components. Therefore, the user can easily replace the recording section from the exposure port.

(J) The above-described recording device further includes a first frame supporting the recording section, a second frame supporting the recording section, and a circuit board mounted on the second frame, wherein the circuit board overlaps the second frame when viewed from the one direction, the partitioning board, the flow path, the second frame, and the circuit board are arranged in this order in the one direction, the housing has a surface extending in the one direction and a vertical direction, a through hole that communicates the inside of the housing with the outside of the housing is opened in the surface, and the through hole may overlap with the flow path when the surface is viewed from the front. There is a risk that the heat of the circuit board may reach the flow path via the second frame. In this regard, according to the above-described configuration, it is possible to reduce the risk that the flow path is heated by the air flowing into the housing through the through hole or the air flowing out of the housing through the through hole.

(K) In the above-described recording device, an uppermost end of the through hole may be at a position equal to or higher than an uppermost end of the circuit board. The air heated by the circuit board tends to flow upward. Therefore, according to the above-described configuration, the air heated by the circuit board flows into the housing from the through hole or flows together with the air flowing out of the housing from the through hole. Thus, the risk that the air heated by the circuit board stagnates in the housing is reduced. Therefore, the risk that the flow path is heated by the circuit board is reduced.

(L) In the above-described recording device, a partitioning board opening may be opened on the partitioning board to communicate the inside of the housing with the discharge space. According to the above configuration, the air flows between the inside and the outside of the housing through the partitioning board opening and the through hole, thereby reducing the risk that the flow path is heated by the circuit board.

(M) The above-described recording device may further include a fan configured to cause air to flow out of the housing through the through hole. According to the above-described configuration, it is possible to reduce the risk that the flow path is heated by the circuit board.

(N) The above-described recording device may further include a fan configured to cause air to flow into the housing through the through hole. According to the above-described configuration, it is possible to reduce the risk that the flow path is heated by the circuit board.

(O) The above-described recording device further include a reading section supported by the first frame and the second frame and configured to read an image of a document, wherein a part of the flow path may be surrounded by the reading section, the second frame, and the partitioning board. According to the above-described configuration, a part of the flow path is protected by the reading section, the second frame, and the partitioning board.

(P) The above-described recording device further include an air vent port is opened in the surface, wherein the air vent port may be located below the through hole on the surface. According to the above-described configuration, the air flows inside and outside the housing through the through hole and the air vent port, thereby reducing the risk that the flow path is heated by the circuit board.

(Q) In the above-described recording device, an uppermost end of the through hole may be at a position equal to or higher than an uppermost end of the circuit board and a lowermost end of the air vent port may be at a position equal to or lower than a lowermost end of the circuit board. According to the above configuration, the air flowing from the through hole toward the air vent port or the air flowing from the air vent port toward the through hole covers over the entire length of the circuit board. Therefore, the air easily cools the entire circuit board. Therefore, the risk that the flow path is heated by the circuit board is reduced.

What is claimed is:

1. A recording device comprising:

a recording section configured to eject liquid;

a mounting section on which a container containing a liquid is mounted;

a flow path coupled to the recording section and the mounting section;

a housing that houses the recording section, the mounting section, and the flow path, the housing defines a discharge space to which a medium recorded by the recording section is discharged; and a stacking section attached to the housing and on which medium discharged to the discharge space is stacked, wherein the discharge space is a space outside the housing, the flow path overlaps with the discharge space when viewed from a one direction, the stacking section has a stacking surface for receiving the medium, the flow path has an upper portion positioned above the stacking surface, and the upper portion does not overlap the stacking surface when viewed from a vertical direction.

2. The recording device according to claim 1, wherein the recording section is positioned below the discharge space.

3. The recording device according to claim 1, wherein the flow path includes a first end portion coupled to the mounting section and a second end portion coupled to the recording section and when viewed from the one direction, a center of the mounting section in a horizontal direction is located between the first end portion and the second end portion.

4. The recording device according to claim 1, wherein the flow path overlaps with the mounting section when viewed from the one direction.

5. The recording device according to claim 1, further comprising:

a support section facing the recording section, wherein the support section supports a medium and the recording section is displaced between a recording position at which liquid is ejected onto the medium supported by the support section and a retreat position that is further away from the support section than the recording position.

6. The recording device according to claim 1, wherein the recording section has an ejection surface from which liquid is ejected, the mounting section includes a reserve section configured to store the liquid supplied from the container, and the reserve section stores the liquid so that a liquid level reaches a position lower than the ejection surface.

7. The recording device according to claim 1, wherein the stacking section includes a partitioning board extending upward from the stacking surface, the partitioning board extends in a direction perpendicular to the one direction and in a vertical direction, the discharge space is located in a direction opposite to the one direction with respect to the partitioning board, and the upper portion is located in the one direction with respect to the partitioning board.

8. The recording device according to claim 7, wherein an exposure port for exposing inside is opened in the housing, the stacking section is configured to be displaced between an open state in which the exposure port is exposed and a closed state in which the exposure port is closed, the recording section includes a head in which nozzles are opened, a head control section configured to control the head, and a joint to which the flow path is coupled, and the head control section and the joint are located above the head and are exposed from the exposure port.

9. The recording device according to claim 7, further comprising:

a first frame supporting the recording section;

a second frame supporting the recording section; and a circuit board mounted on the second frame, wherein the circuit board overlaps the second frame when viewed from the one direction, the partitioning board, the flow path, the second frame, and the circuit board are arranged in this order in the one direction, the housing has a surface extending in the one direction and a vertical direction, a through hole that communicates an inside of the housing with an outside of the housing is opened in the surface, and the through hole overlaps with the flow path when the surface is viewed from a front.

10. The recording device according to claim 9, wherein an uppermost end of the through hole is at a position equal to or higher than an uppermost end of the circuit board.

11. The recording device according to claim 9, wherein a partitioning board opening is opened on the partitioning board to communicate the inside of the housing with the discharge space.

12. The recording device according to claim 9, further comprising:

a fan configured to cause air to flow out of the housing through the through hole.

13. The recording device according to claim 9, further comprising:

a fan configured to cause air to flow into the housing through the through hole.

14. The recording device according to claim 9, further comprising:

a reading section supported by the first frame and the second frame and configured to read an image of a document, wherein a part of the flow path is surrounded by the reading section, the second frame, and the partitioning board.

15. The recording device according to claim 9, further comprising:

an air vent port is opened in the surface, wherein the air vent port is located below the through hole on the surface.

16. The recording device according to claim 15, wherein an uppermost end of the through hole is at a position equal to or higher than an uppermost end of the circuit board and a lowermost end of the air vent port is at a position equal to or lower than a lowermost end of the circuit board.

* * * * *